US012774901B2

(12) United States Patent
Seiler

(10) Patent No.: US 12,774,901 B2
(45) Date of Patent: Oct. 27, 2026

(54) METHOD AND APPARATUS FOR INCREMENTAL MAPPING OF HAUL ROADS

(71) Applicant: Technological Resources Pty. Limited, Melbourne (AU)

(72) Inventor: Konstantin M. Seiler, Sydney (AU)

(73) Assignee: TECHNOLOGICAL RESOURCES PTY. LIMITED, Melbourne (AU)

( * ) Notice: Subject to any disclaimer, the term of this patent is extended or adjusted under 35 U.S.C. 154(b) by 459 days.

(21) Appl. No.: 18/038,548

(22) PCT Filed: Nov. 26, 2021

(86) PCT No.: PCT/AU2021/051418
§ 371 (c)(1),
(2) Date: May 24, 2023

(87) PCT Pub. No.: WO2022/109681
PCT Pub. Date: Jun. 2, 2022

(65) Prior Publication Data
US 2024/0094027 A1 Mar. 21, 2024

(30) Foreign Application Priority Data
Nov. 26, 2020 (AU) ................................ 2020904376

(51) Int. Cl.
*G01C 21/00* (2006.01)
*E02F 7/00* (2006.01)

(52) U.S. Cl.
CPC ............ *G01C 21/3841* (2020.08); *E02F 7/00* (2013.01); *G01C 21/3822* (2020.08)

(58) Field of Classification Search
CPC ............ G01C 21/3841; G01C 21/3822; G01C 21/3844; G01C 21/3885; G01C 21/3815; E02F 7/00; G08G 1/202; G09B 29/106
See application file for complete search history.

(56) References Cited

U.S. PATENT DOCUMENTS

2002/0143461 A1* 10/2002 Burns .................. G05D 1/0297 701/23
2006/0190507 A1 8/2006 Sekine et al.
(Continued)

FOREIGN PATENT DOCUMENTS

JP 2020523660 A 8/2020
KR 101206570 B1 11/2012

OTHER PUBLICATIONS

Mar. 17, 2022 (WO) International Search Report and Written Opinion—Appl. No. PCT/AU2021/051418.
(Continued)

*Primary Examiner* — Anne Marie Antonucci
*Assistant Examiner* — Wesam Almadhrhi
(74) *Attorney, Agent, or Firm* — Banner & Witcoff, Ltd.

(57) ABSTRACT

A method for issuing updates of a map in respect of a geographical area, comprising clusters of vehicle positions with connections between clusters, comprised of a number of points allocated thereto, corresponding to respective ones of the vehicles at respective times, operating a data communications assembly to establish data communications with each of the vehicles via a data communications network receiving position reports from each of the vehicles across the data communications network with the data communications assembly generating batches of points from the position reports corresponding to vehicle positions operating the processing assembly to make batch-by-batch comparisons of points of a batch with positions of the clusters of the map based upon the comparisons, updating the map by performing a cluster update procedure and operating the processing assembly thereby produce an updated map and operating the data communications assembly to transmit the updated map to a remote user.

20 Claims, 23 Drawing Sheets

6 hours

(56) References Cited

U.S. PATENT DOCUMENTS

| | | | | |
|---|---|---|---|---|
| 2009/0037440 | A1* | 2/2009 | Will | G06F 18/231 |
| 2012/0116678 | A1* | 5/2012 | Witmer | G09B 29/00<br>702/5 |
| 2014/0195535 | A1* | 7/2014 | Kiraly | G06F 16/29<br>707/737 |
| 2017/0041761 | A1 | 2/2017 | Mori et al. | |
| 2017/0177933 | A1* | 6/2017 | Mittal | G06F 18/22 |
| 2019/0361454 | A1 | 11/2019 | Zeng et al. | |
| 2020/0193170 | A1 | 6/2020 | Braybrook | |
| 2020/0226119 | A1 | 7/2020 | Naruse et al. | |

OTHER PUBLICATIONS

May 14, 2024—(EP) Extended European Search Report—App 21895959.1.

Schroedl, S., Wagstaff, K., Rogers, S., Langley, P., & Wilson, C. (2004). Mining GPS traces for map refinement. Data mining and knowledge Discovery, 9, 59-87.

Jan. 6, 2026—(JP) Decision to Grant—App No. 2023-532373.

* cited by examiner

R (a) Before pruning (b) After pruning

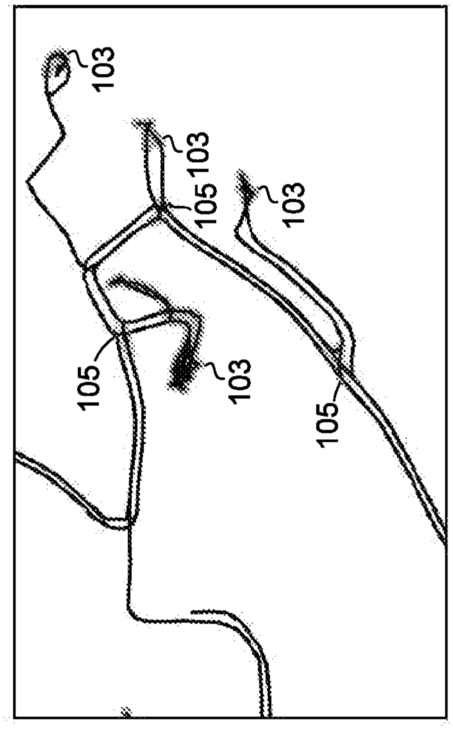
FIG. 18A 6 hours
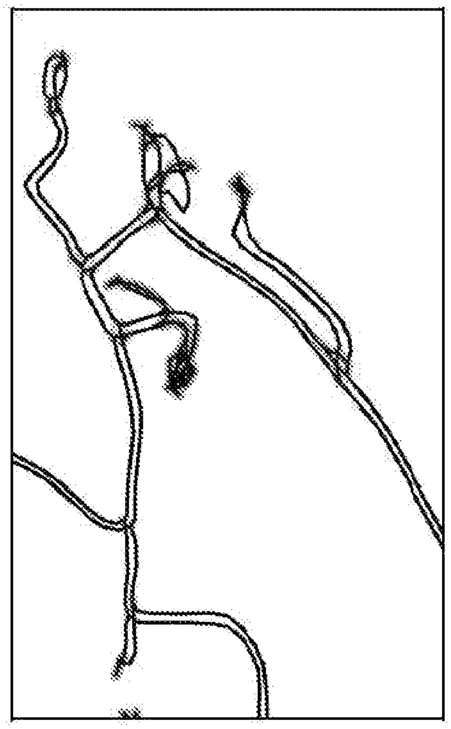
FIG. 18B 12 hours
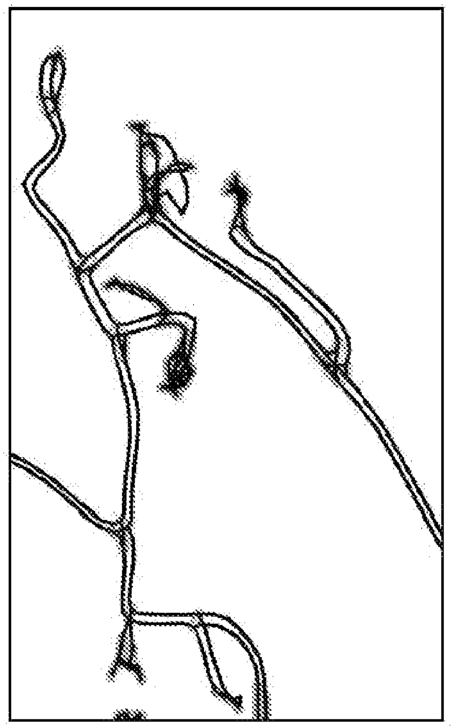
FIG. 18C 1 day
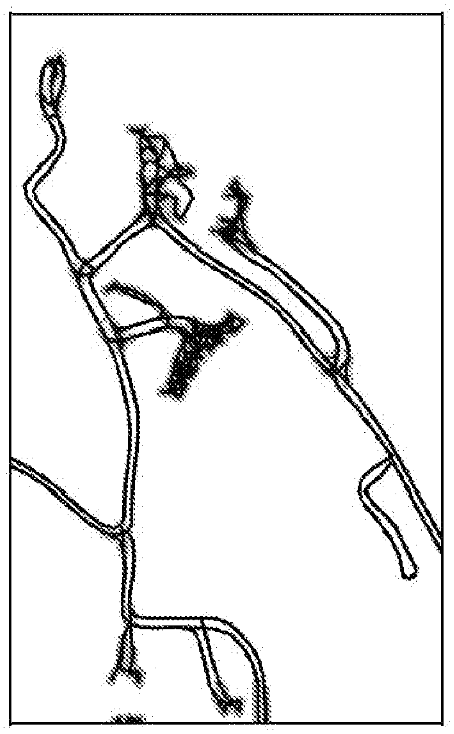
FIG. 18D 2 days

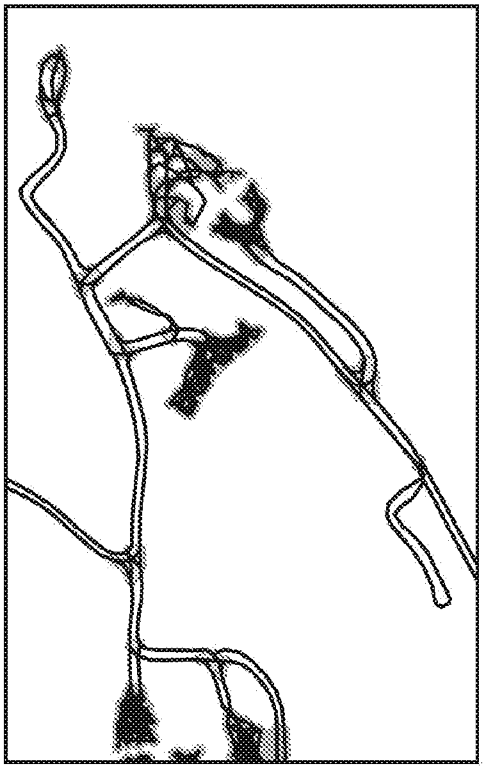
FIG. 18E 7 days
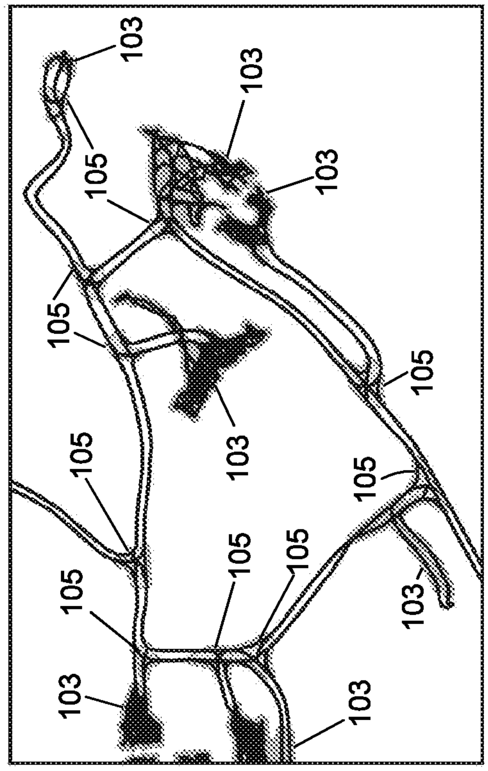
FIG. 18F 30 days
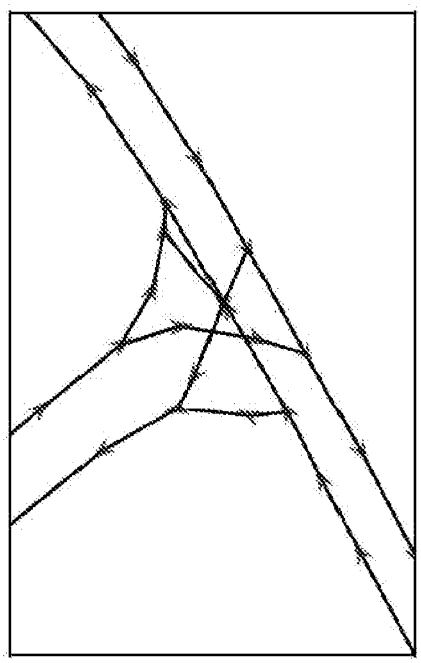
FIG. 19A Chord Angle
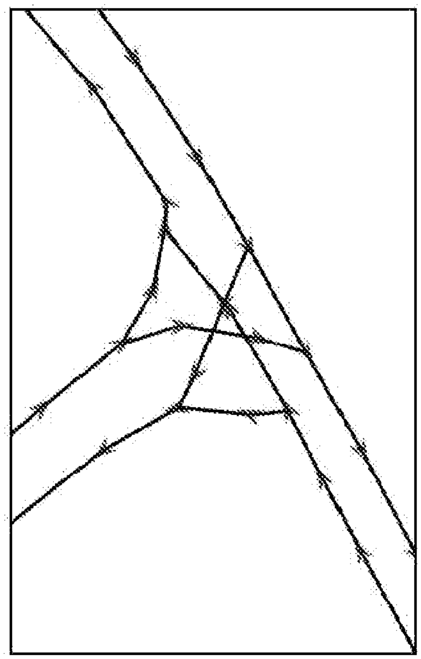
FIG. 19B Chord Angle Pruned

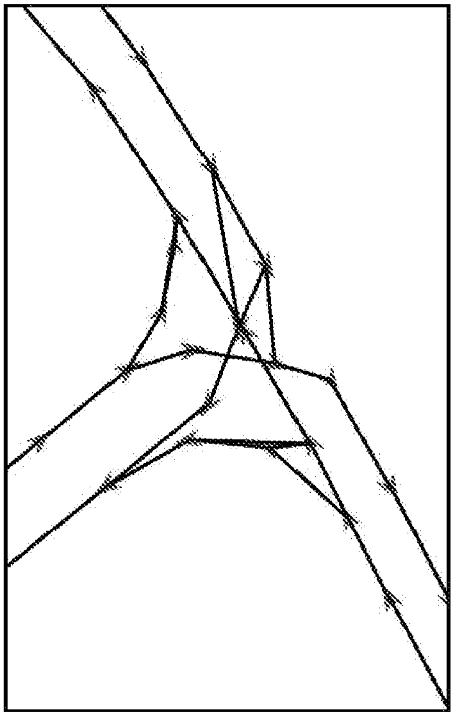
FIG. 19C Dubins
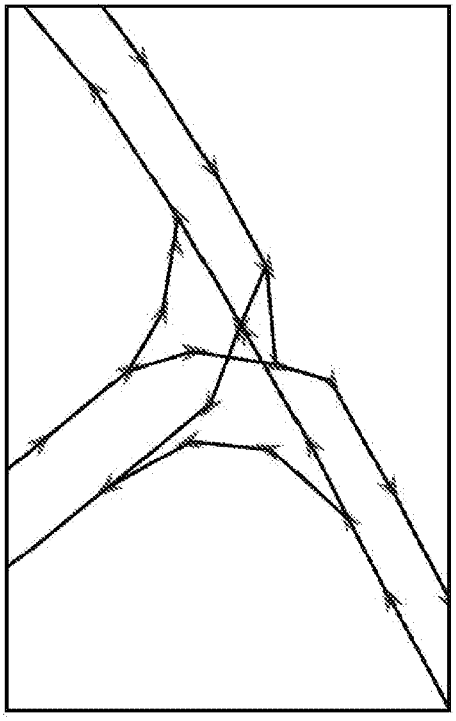
FIG. 19D Dubins pruned
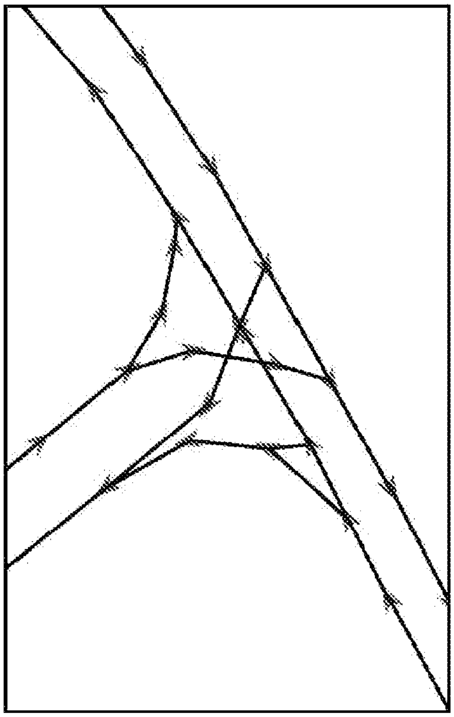
FIG. 19E Gravity
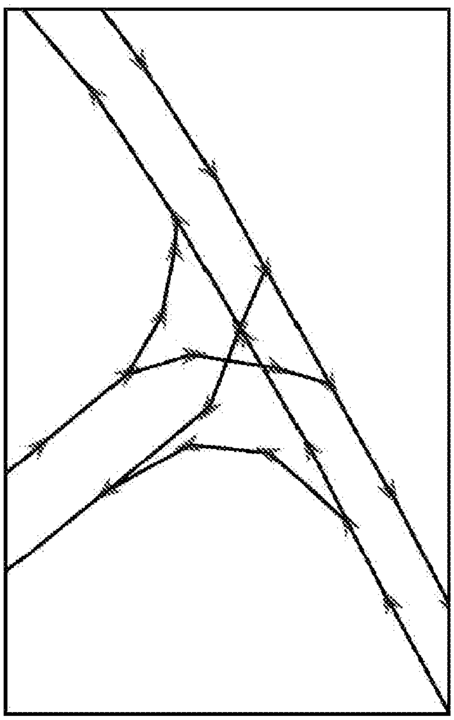
FIG. 19F Gravity pruned

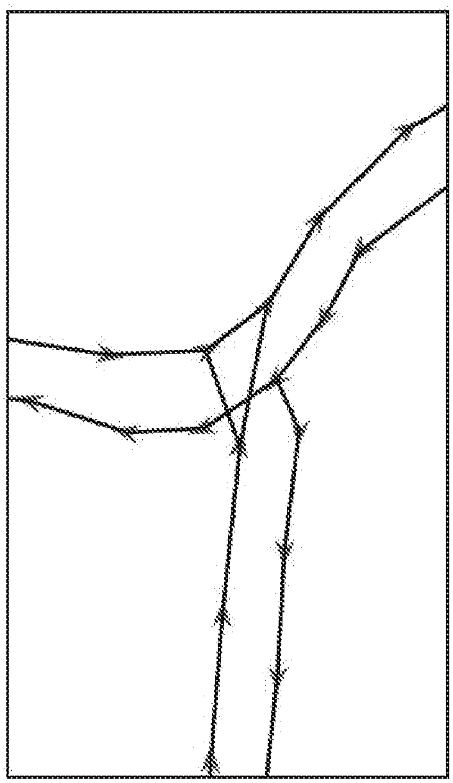
FIG. 20A Chord Angle
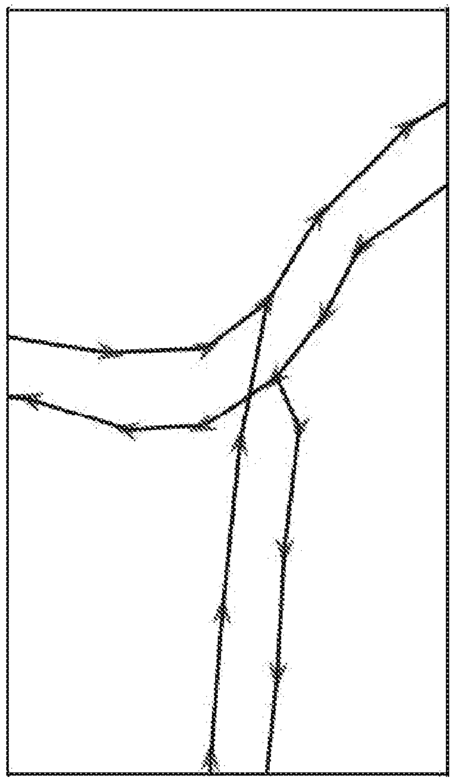
FIG. 20B Chord Angle Pruned
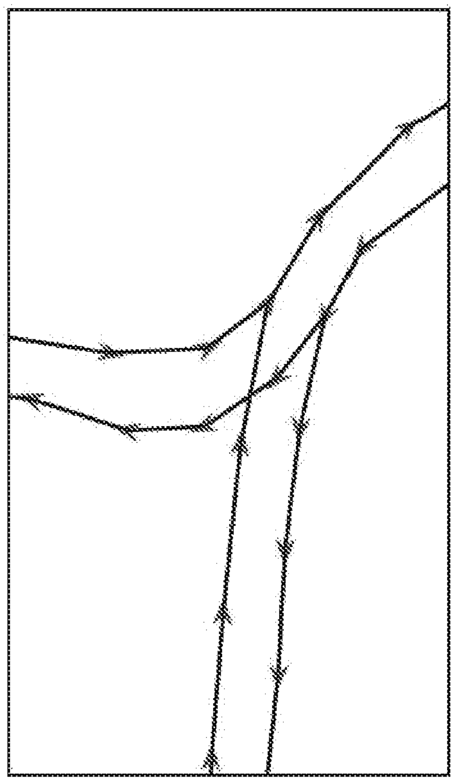
FIG. 20C Dubins
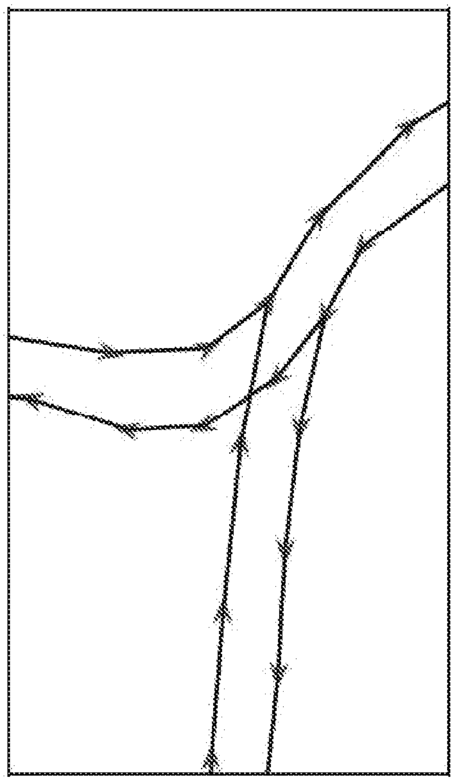
FIG. 20D Dubins Pruned

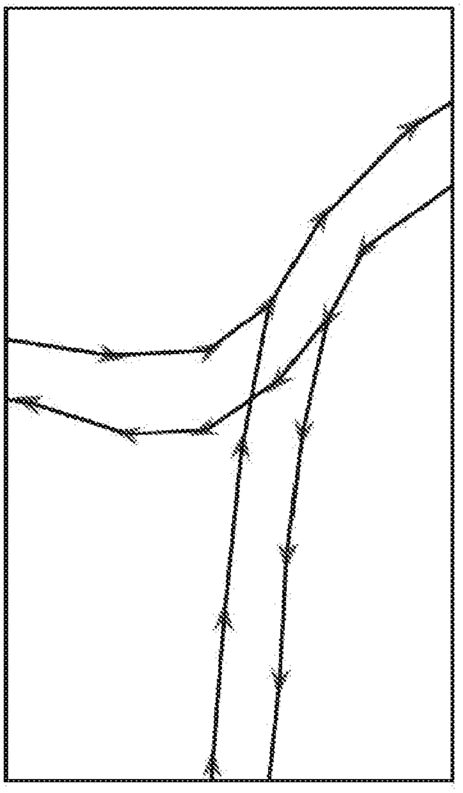
FIG. 20F Dubins Pruned
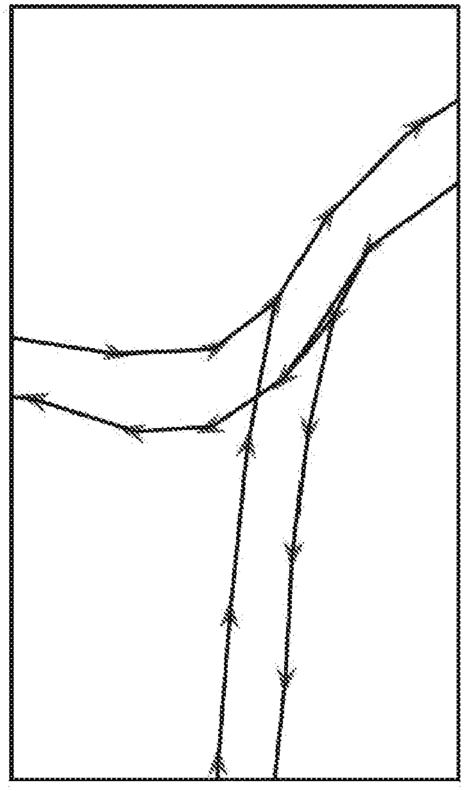
FIG. 20E Gravity

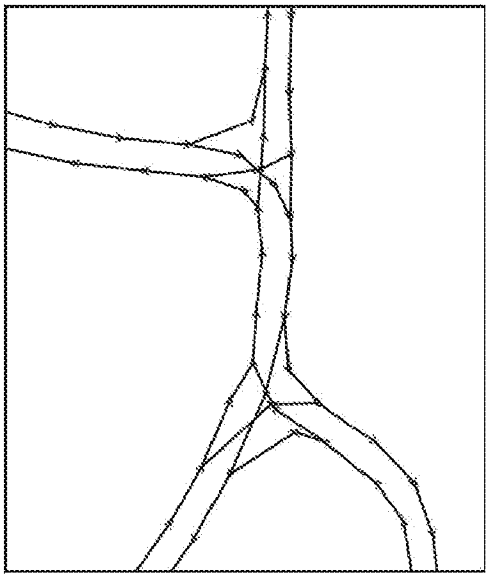
FIG. 21A 5 Seconds Sampling
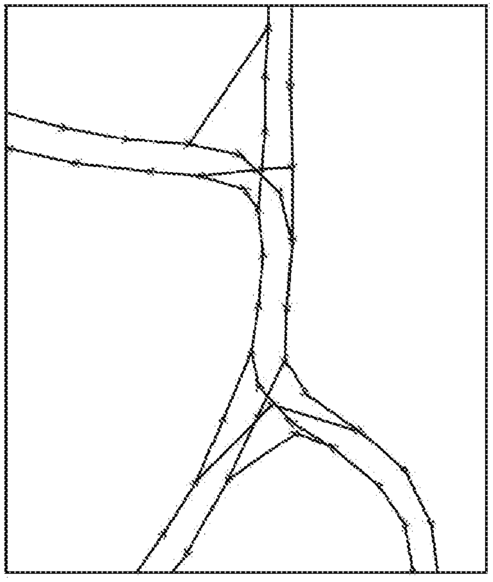
FIG. 21B 10 Seconds Sampling
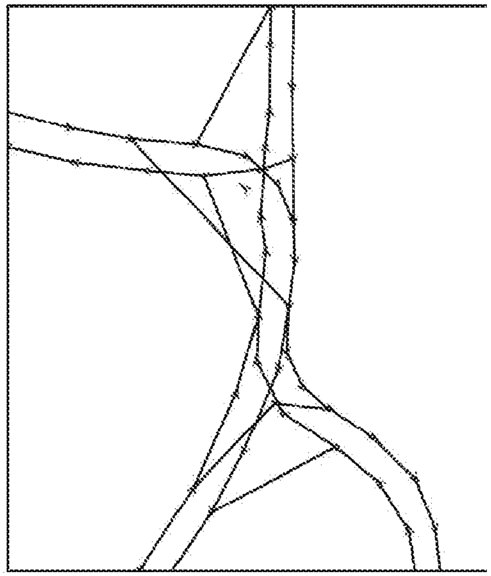
FIG. 21C 15 Seconds Sampling
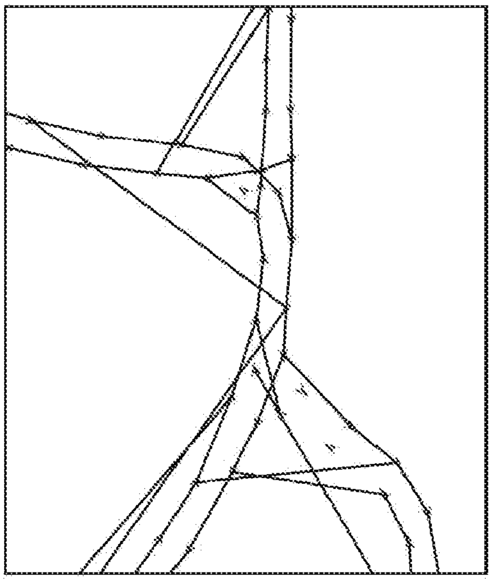
FIG. 21D 20 Seconds Sampling

METHOD AND APPARATUS FOR INCREMENTAL MAPPING OF HAUL ROADS

CROSS-REFERENCE TO RELATED APPLICATIONS

This application is a U.S. National Stage application under 35 U.S.C. § 371 of International Application PCT/AU2021/051418 (published as WO 2022/109681 A1), filed on Nov. 26, 2021, which claims the benefit of priority to Australian Application No. 2020904376, filed on Nov. 26, 2020, and each of these prior applications is hereby incorporated by reference in its entirety.

TECHNICAL FIELD

The present disclosure concerns methods and apparatus for incrementally mapping haul roads such as, but not limited to, haul roads of an open cut mine.

BACKGROUND ART

Any references to methods, apparatus or documents of the prior art are not to be taken as constituting any evidence or admission that they formed, or form part of the common general knowledge.

Efficient dispatching of haul trucks in an open cut mine heavily depends on a road network map that accurately represents the topography and connectivity of the haul operation. Fleet Management Systems utilize the map to compute routes and predict travel times between locations. In turn, these are then used to compute optimal shovel coverage for maximizing global objective functions (e.g. maximizing total material moved, achieve blend, etc). As such, the quality of the road map has a direct impact on truck queues, shovel hang times as well as product blend and crusher feeds.

Inferring a road network map from electronic position reports comprising GPS or GNNS data has been studied previously. However, previous approaches assume a static road network, the layout of which can be inferred using large amounts of data collected over long time frames. This contrasts the situation in environments such as open cut mining where only a small number of vehicles (compared to an urban environment) travel a road network and the layout of the network is continuously changing as the mine progresses.

Stanojevic et al. [1] present a cluster-based approach for offline road network generation. All GPS points with heading are clustered using k-means clustering. Then, in a second step, clusters are connected according to the GPS paths. Stanojevic et al. [1] also provide a solution which incrementally adds new GPS data as it becomes available. However, this version of the procedure only extends the road map and is unable to revise or refine the map as new data becomes available.

In contrast, it would be desirable if a vehicle tracking and map generation method and apparatus were provided that was capable of tracking vehicles and processing vehicle position data to change existing parts of a road map as new vehicle positions become available.

SUMMARY

According to an aspect of the present disclosure there is provided a method for issuing updates of a map in respect of a geographical area, the map being stored in an electronic memory assembly, the map comprising clusters of vehicle positions with connections between clusters, the clusters each comprised of a number of points allocated thereto, the points corresponding to respective ones of the vehicles at respective times, the method comprising:

operating a data communications assembly to establish data communications with each of the vehicles via a data communications network;

receiving position reports from each of the vehicles across the data communications network with the data communications assembly;

operating a processing assembly to generate batches of points from the position reports, the points corresponding to vehicle positions for respective vehicles at respective times, in the electronic memory assembly;

operating the processing assembly to make batch-by-batch comparisons of points of a batch with positions of the clusters of the map;

based upon the comparisons, operating the processing assembly to update the map by performing a cluster update procedure comprising performing each of the following at least once:

a. allocate points of the batch to clusters;
b. reallocate points of the maps to clusters;
c. update positions of the clusters taking into account the allocation and reallocation of the points;
d. create new clusters based on remote points of the batch;
e. merge clusters closer to each other than a predetermined distance;
f. delete clusters with no points allocated thereto; and operating the processing assembly to update the connections between the clusters subsequent to the cluster update to thereby produce an updated map; and operating the data communications assembly to transmit the updated map via the data network to a remote user.

In an embodiment the operating of the processing assembly to generate batches of points from the position reports comprises forming batches of input records from consecutive vehicle location points of a vehicle wherein a first point of the input record comprises a source point and a second point comprises a target point.

In an embodiment the method includes adding the input records to the batch of input records until either a new map is created or until a predetermined batch size is reached.

In an embodiment the method includes, for each of the source point and the target point, finding a closest cluster of the current map.

In an embodiment the method includes for each of the source point and target point, determining if said point is a distance less than a predetermined cluster radius from the nearest cluster.

In an embodiment the method includes, if said point is a distance less than the predetermined cluster radius from the nearest cluster, then allocating said point to the nearest cluster.

In an embodiment the method includes, updating the position of the nearest cluster taking the allocating of said point into account.

In an embodiment the method includes, if said point is not a distance less than the predetermined cluster radius from the nearest cluster, creating a new cluster using the position of said point as the position of the new cluster.

In an embodiment subsequent to step c., for each point determining if the point is within a cluster radius of a cluster that it is currently allocated to ("its old cluster") and if it is not within the cluster radius then removing the point from allocation with the old cluster and updating the old cluster's position taking into account the removal of the point.

In an embodiment reallocating the point to a closest cluster ("the new cluster") within the cluster radius and updating the new cluster's position taking into account the reallocation of the point to the new cluster.

In an embodiment step e. includes for each cluster ("first cluster") identifying a cluster ("second cluster") closer than the predetermined distance to thereto and reallocating all points of the second cluster to the first cluster.

In an embodiment the method includes determining if the source point and the target point indicate a connection.

In an embodiment the method includes, if the source point and the target point indicate a connection then updating a connection count record in a portion of the electronic memory assembly.

In an embodiment the method includes, processing high level connections to determine a corresponding sequence of low-level connections.

In an embodiment the method includes, processing the high-level connections to determine a corresponding sequence of low-level connections by applying one or more of the following procedures to the high-level connections:

chord angle filtering;

Dubins path sequence;

gravity rubber banding.

In an embodiment the method includes processing the high-level connections to determine a corresponding sequence of low-level connections includes identifying, for each of the high-level connections, a midpoint between clusters at either end of the high-level connection.

In an embodiment the method includes processing the high-level connections to determine the corresponding series of low-level connections includes deeming all clusters with a circle around the midpoint that passes through the start and end clusters to be candidates for intermediate clusters in the sequence of low-level connections.

In an embodiment the method includes tagging high-level connections to be subsequently updated.

In an embodiment the method includes removing points (or "pruning points") from the electronic memory assembly.

In an embodiment the method includes, removing points allocated to clusters representing nodes of a road network that has been removed from the geographical area.

In an embodiment the method includes, setting a fixed number of points to be retained in the electronic memory assembly and removing points based on their age to prevent the fixed number being exceeded.

In an embodiment the method includes, setting a fixed number of points to be retained in the electronic memory assembly and removing points taking into account that points along heavily travelled roads can be removed earlier due to an abundance of data whereas points belonging to rarely travelled roads should be kept longer.

In an embodiment the method includes, checking all clusters to identify points that can be removed from the map without removing connections between clusters and then removing such points.

In an embodiment the method includes, monitoring positions of predetermined types of machinery operating in the geographical area and deeming that an area in which said machinery is operational is no longer drivable whilst said machinery is operational and removing corresponding points from the electronic map.

In an embodiment the method includes post-processing the electronic map subsequent to processing a batch of input records and prior to transmitting the updated map via the data network to remote user.

In an embodiment the post-processing includes tagging free-drive areas of the map.

In an embodiment the post-processing includes tagging free-drive areas in the electronic map by identifying predetermined functional areas.

In an embodiment the predetermined functional areas include ore loading and ore unloading areas.

In an embodiment the post-processing includes, trimming areas tagged as free drive areas in the electronic map.

In an embodiment the post-processing includes identifying artefacts in the electronic map due to multi-path connections and deleting superfluous low-level connections.

In an embodiment the post processing includes identifying and tagging intersections in the electronic map.

In an embodiment the method includes associating a three-dimensional coordinate with each of the source point, target point and nearest cluster, the three-dimensional coordinate including two dimensions for position on a plane and a third for orientation wherein each distance is determined based on said three dimensional coordinates.

In an embodiment the method includes operating a human machine interface of a vehicle to display the electronic map to an operator of the vehicle for the operator's reference in operating the vehicle in the area mapped by the electronic map.

In a further aspect there is provided a system for generating and updating an electronic map of paths travelled by vehicles in a geographical area, the system comprising:

a plurality of vehicles located in the geographical area and each fitted with a position tracker and a vehicle communications system to transmit a series of chronological position reports in respect of the vehicle;

a data communications network in data communication with the vehicle communications system of each of the plurality of vehicles;

a map generation assembly (MGA) including a processing assembly and an electronic memory assembly, the map generation assembly being in data communication with the data communications network and arranged to receive the position reports, the MGA being configured to;

generate batches of points from the position reports, the points corresponding to vehicle positions for respective vehicles at respective times, in the electronic memory assembly;

operating the processing assembly to make batch-by-batch comparisons of points of a batch with positions of the clusters of the map;

based upon the comparisons, operating the processing assembly to update the map by performing a cluster update procedure comprising performing each of the following at least once:

a. allocate points of the batch to clusters;

b. reallocate points of the maps to clusters;

c. update positions of the clusters taking into account the allocation and reallocation of the points;

d. create new clusters based on remote points of the batch;

e. merge clusters closer to each other than a predetermined distance;

f. delete clusters with no points allocated thereto; and operate the processing assembly to update the connections between the clusters subsequent to the cluster update to thereby produce an updated map; and transmit the updated map via the data network to a remote user.

According to a further aspect of the present disclosure there is provided a system for generating and updating an electronic map of paths travelled by vehicles in a geographical area, the system comprising:

a plurality of vehicles located in the geographical area and each fitted with a position tracker and a vehicle communications system to transmit a series of position reports in respect of the vehicle;

a data communications network in data communication with the vehicle communications system;

a map generation assembly (MGA) in data communication with the data communications network and arranged to receive the position reports, the MGA being configured to;

for position reports received in respect of each of the vehicles, make a comparison of a position of the vehicle from the position report with a position of a closest cluster of the electronic map;

based upon the comparison either updating the cluster position or creating a new cluster to thereby update the electronic map; and transmit a copy of the updated electronic map to a remote user via the data communications network.

According to a further aspect of the present disclosure there is provided a method for generating and updating an electronic map of paths travelled by vehicles in a geographical area, the method comprising:

establishing data communications with each of the vehicles via a data communications network;

receiving position reports from each of the vehicles across the data communications network;

for position reports received in respect of each of the vehicles, making a comparison of a position of the vehicle from the position report with a position of a closest cluster of the electronic map;

based upon the comparison either updating the cluster position or creating a new cluster thereby updating the electronic map; and transmitting the updated map via the data network to a remote user.

BRIEF DESCRIPTION OF THE DRAWINGS

Preferred aspects features, embodiments and variations may be discerned from the following Detailed Description which provides sufficient information for those skilled in the art to perform the claimed subject matter. The Detailed Description is not to be regarded as limiting the scope of the preceding Summary in any way. The Detailed Description will make reference to a number of drawings as follows:

FIGS. 18A to 18F depict maps generated with different amounts of vehicle position data ranging from 6 hours to 30 days of data.

FIGS. 19A to 19F depict maps of an intersection created by the MGA implementing different procedures for determining intermediate cluster sequences showing before and after pruning for each of three different procedures.

FIGS. 20A to 20F depict maps of an intersection created by the MGA implementing different procedures for intermediate cluster sequences showing before and after pruning for three different procedures.

FIGS. 21A to 21D compare sections of maps created by the MGA using different sampling intervals.

DETAILED DESCRIPTION OF PREFERRED EMBODIMENTS

Figure 1:
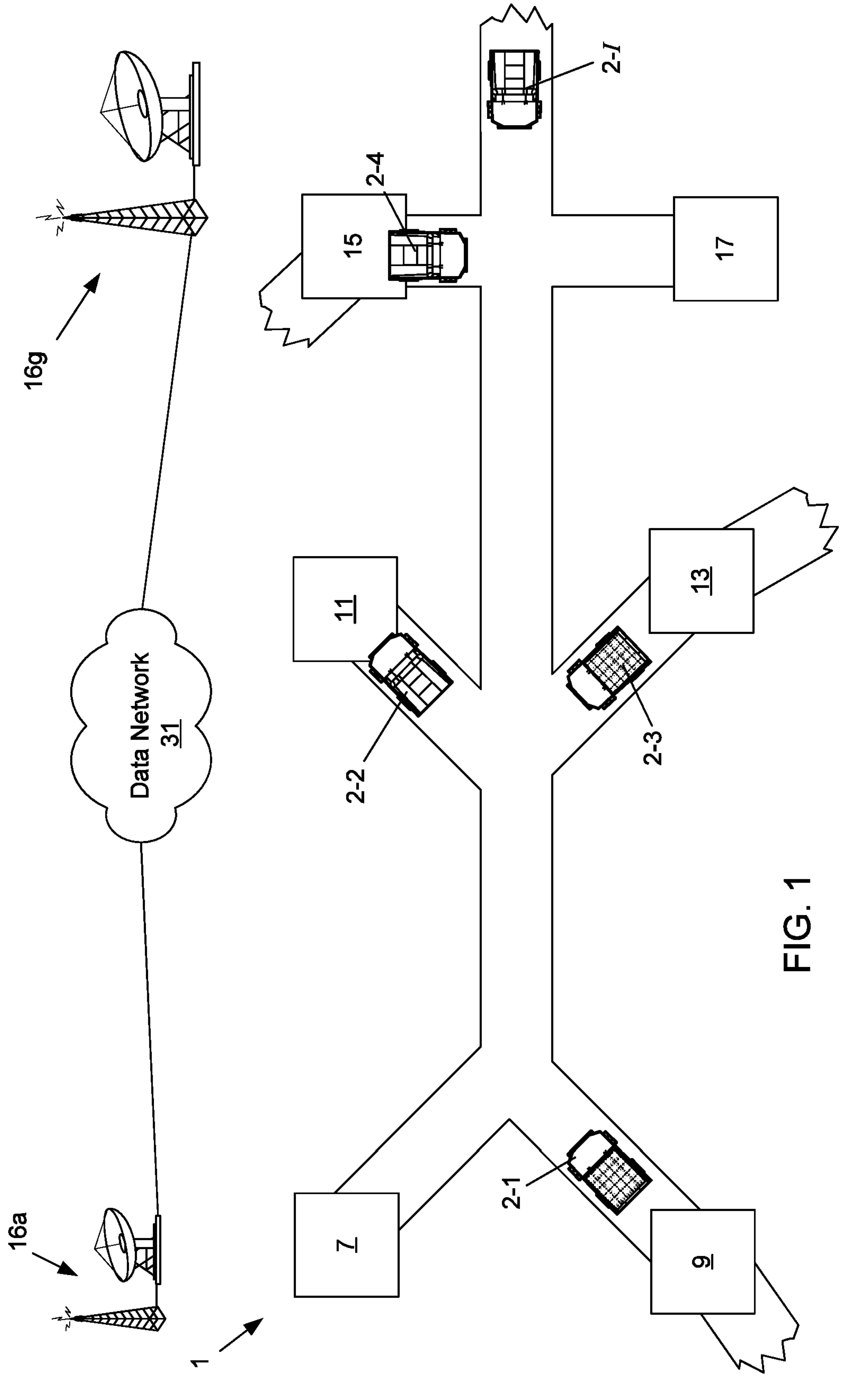
FIGS. 1 and 2 depict vehicles in communication with a data network and travelling over roads in a geographical area.
Figure 2:
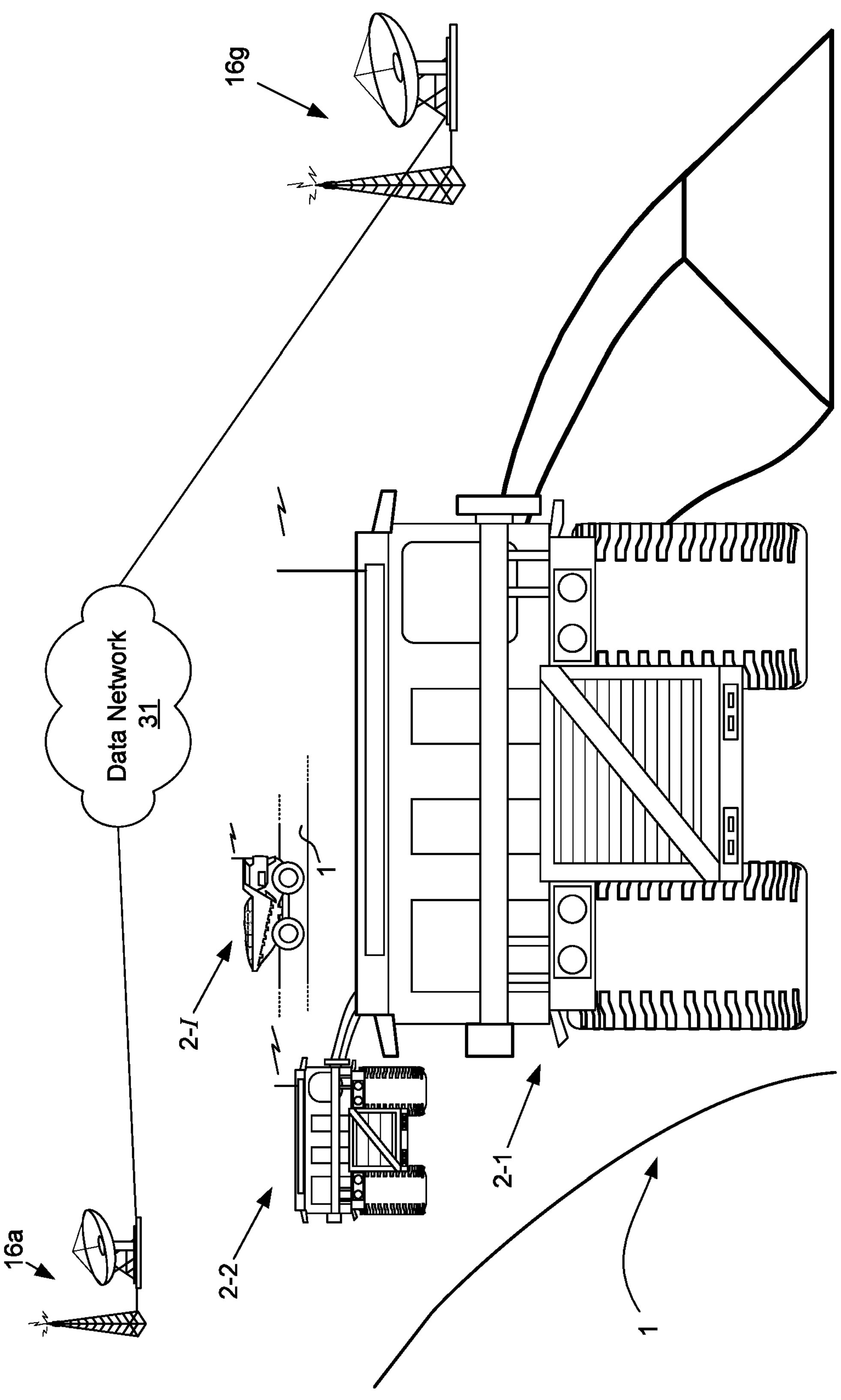

FIGS. 1 and 2 stylistically depict a portion of a road network 1 of a mining environment, in which systems, methods and apparatus according to embodiments are implemented. In the mining environment vehicles such as mine haul trucks 2-1, . . . , 2-I traverse a road network 1 in order to perform hauling tasks, for example, by moving material between stations. The stations may include various operational sites, identified in FIG. 1, such as a crusher site 7, a loading site 9, a dump site 11, a shipping site 13, a stockpile site 15 and a maintenance site 17. In performing their tasks the mine haul trucks 2-1, . . . , 2-I travel along paths over the road network 1. As will be discussed further, each of the vehicles includes a position tracker that is able to generate positions, e.g. GPS data at progressive times as the vehicle proceeds along its path. The output from the position tracker is transmitted by a vehicle communication system of the vehicle to data network 31 for further processing including map generation and updating.

As previously mentioned, efficient dispatching of haul trucks in an open cut mine heavily depends on the mine administrator having a map of the road network that accurately represents the topography and connectivity of the haul operation. It will be understood that the term "mine administrator" encompasses human and non-human decision makers that need to make reference to a current map of the road network. The term includes, non-exhaustively, fleet management systems, software that efficiently dispatches vehicles, and operators of vehicle fleets such as controllers that set up and control a fleet management system. The road network in a dynamic environment, such as an open cut mine changes over time as new parts of the mine are developed and old parts are abandoned. Some changes take place over a long time period whereas others take place over relatively short periods but are still impactful on map accuracy.

Figure 3:
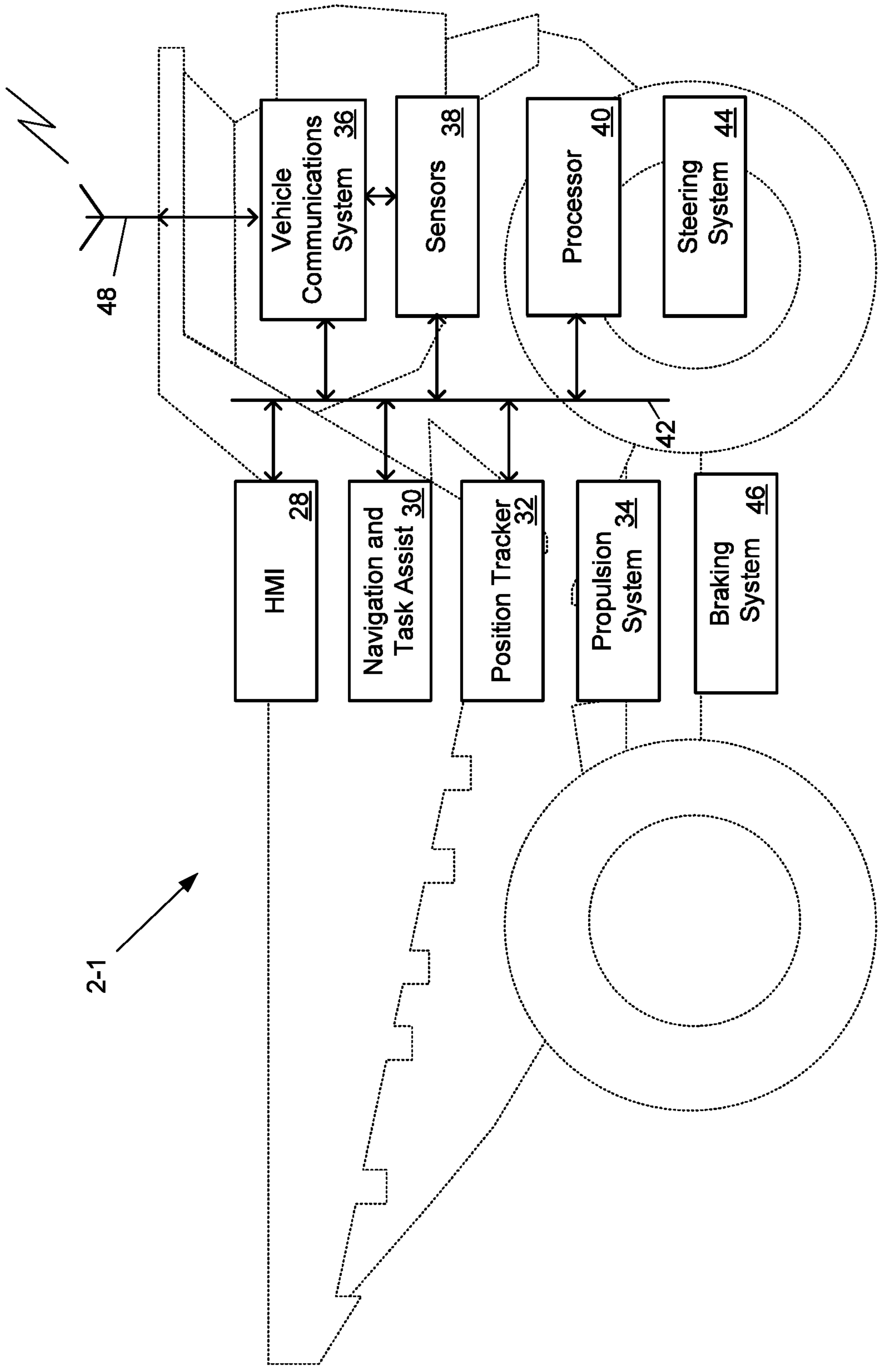
FIG. 3 is a block diagram of a vehicle of the system.

FIG. 3 presents a block diagram of an embodiment of a haul truck 2-1 that is operated by a driver. Autonomous haul trucks are also known and are compatible with the methods described according to embodiments herein. Vehicle 2-1 includes a data bus 42 which facilitates electronic data communication between a processor 40 which is configured to coordinate interactions between a number of assemblies 28, 30, 32, 36 and 38. A Human-Machine-Interface (HMI) 28 is provided which may be a suitably programmed mobile computing device, for example, a tablet personal computer or a personal digital assistant. Alternatively, the HMI 28 may comprise a mobile industrial computer with screen and operator interface for implementing the present system.

As previously mentioned, haul truck 2-1 also includes a position tracker 32, for example a Global Positioning System (GPS) receiver which is configured to generate information about at least the position of the vehicle at each of a series of times, for example five second intervals. The position tracker may also triangulate a position estimate from terrestrial transmitters such as wireless transceivers 16*a*, 16*b* shown in FIG. 3, which are part of data network 31. The position tracker 32 may also include gyroscopes or other inertial navigation apparatus that can also be used to generate position signals indicating the location of vehicle 2-1 within the mine environment. The position tracker 32 is able to ascertain at least the vehicle's position at progressive times as it travels through the area. The haul truck 2-1 also includes a sensor assembly 38 which may include sensors for gauging the weight of the load being hauled, brake condition, steering angle, wheel rotation speed, fuel level, engine temperature, tyre pressure, driver fatigue and radar and/or LiDAR sensors for estimating obstacle proximity.

Vehicle 2-1 also includes a navigation and task assist assembly 30 which generates navigational information that it displays on the HMI 28 to assist the driver to operate the vehicle to complete task assignments. In use the driver refers to information displayed on the HMI 28 and then operates the propulsion system 34, power steering system 44 and braking system 46 accordingly. For example, the HMI may describe a path to be taken by the vehicle.

Vehicle 2-1 also includes a vehicle communications system 36 which is coupled to an antenna 48 for transmitting radio frequency data communications to the data network 31. of which terrestrial receivers 16*a*, 16*b* are part. The vehicle communication system 36 receives messages and commands, including task assignments from a task assignment allocator 55.

Figure 4:
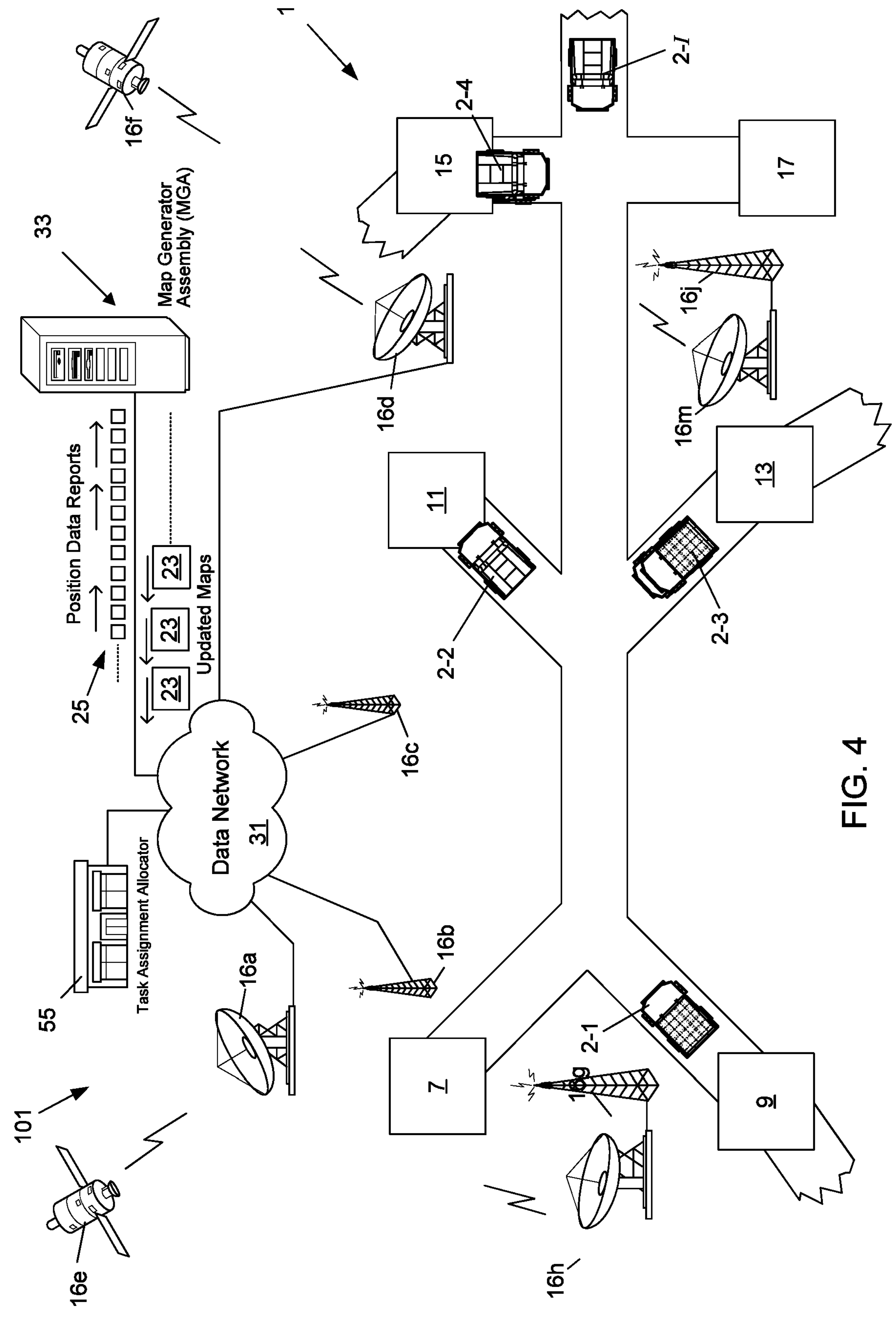
FIG. 4 is a block diagram of a system according to an embodiment of the present disclosure.

Referring now to FIG. 4, a system 101 for incrementally updating a map, or as it is sometimes referred to herein Streaming Map Generation (SMG), comprising a graph stored in an electronic memory arrangement, according to an embodiment is illustrated.

System 101 includes the data network 31 for placing the vehicle communications system 36 of each haul truck 2-1, . . . , 2-I in data communication with MGA 33. The data network 31 includes a collection of wireless data transceivers 16*a*, . . . , 16*m* including satellite and terrestrial transceivers suitable for implementing wireless communication protocols such as WiFi, WiMax, GPRS, EDGE or equivalent terrestrial and satellite wireless data communications. It will be appreciated that these network architectures are provided as examples only and thus are not limiting.

MGA 33 receives a stream of position reports 25 from the vehicles 2-1, . . . , 2-I via the data network 31 which provide location estimates for the vehicles within a defined coordinate frame The position reports contain a position coordinate, time at which the position was generated and information for identifying the vehicle.

The position reports may comprise, or be based, on data from any/all of positioning systems such as US GPS, Russian GLONASS, EU's Galileo positioning system, China's Beidou positioning system or local positioning systems such as India's NavIC and Japan's QZSS.

It will be realized that Global Navigation Satellite Systems (GNSS) such as the US owned Global Positioning System (GPS) is one method of obtaining localization data, other methods such as cell-tower-triangulation based localization might also be used as an alternative or in addition to GNSS.

As will be explained, the MGA 33 is configured to process the position reports 25 in order to maintain and dynamically update a graph that it stores in a storage arrangement which comprises a map 100 of the geographical area in which the vehicles operate. Consequently, upon request or otherwise from time to time, the MGA 31 transmits maps 23 back to the data network. For example the maps 23 may be used by the Task Assignment Allocator 55 to assist it in accurately allocating tasks to the vehicles 2-1, . . . , 2-I in which they travel from an origin to a destination in order to complete a task such as depositing or taking delivery of ore, for optimizing an objective operational function, e.g. maximizing ore output from the mine.

Figure 5:
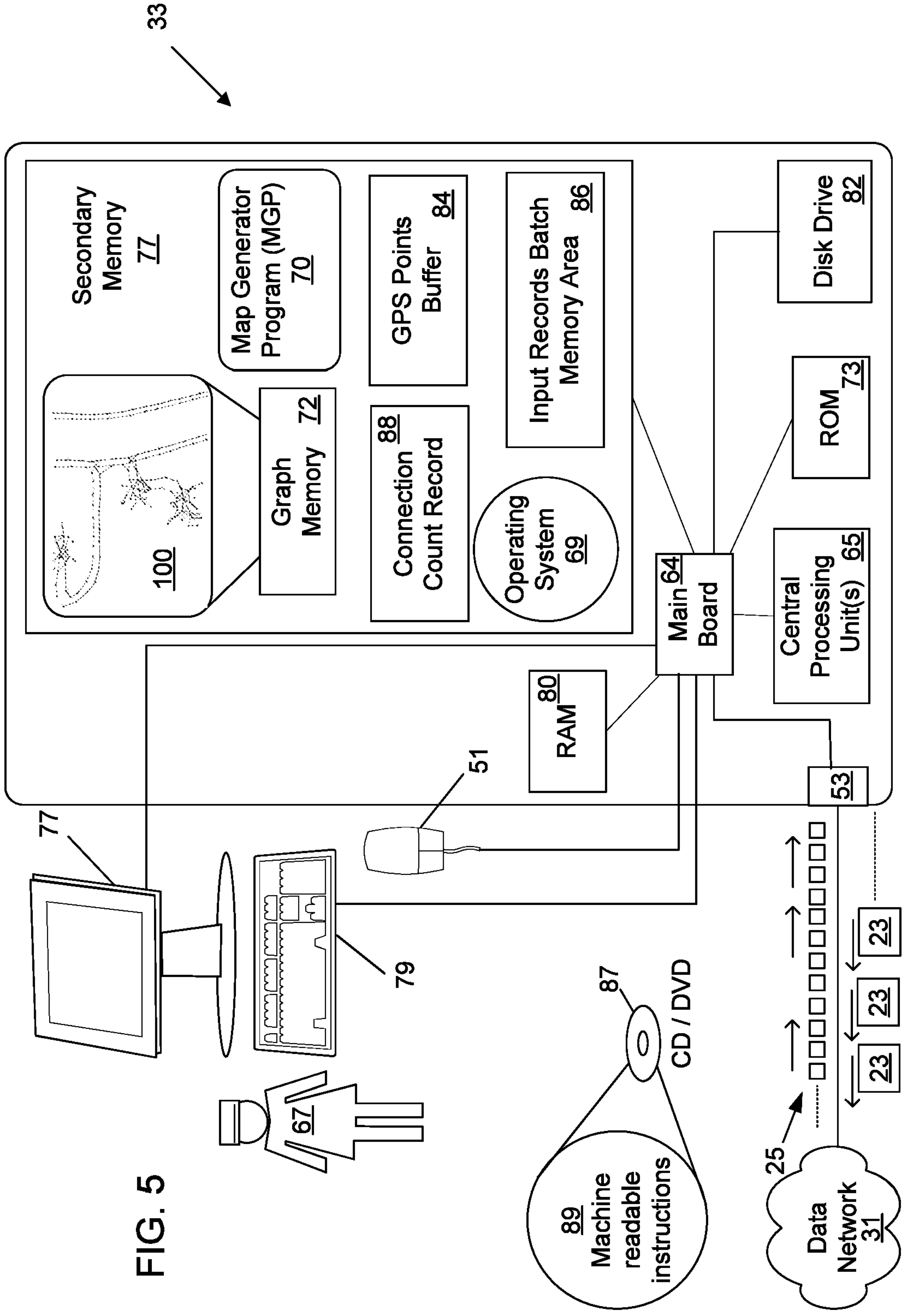
FIG. 5 is a block diagram of a Map Generator Assembly (MGA) according to an embodiment of the present disclosure.

Referring now to FIG. 5, according to a preferred embodiment the MGA 33 is provided in the form of a specially configured processing assembly that is in data communication with the haul trucks 2-1, . . . , 2-I via data network 31.

The embodiment of MGA 33 that will be described is a preferred implementation but not the only possible implementation. In other embodiments the MGA 33 may be implemented as a distributed or decentralized assembly. For example, in other embodiments the MGA 33 may be implemented as a number of servers that each cooperate with each other to undertake different steps of the method that will be described or which each dynamically update different portions of a geographic area of interest that is to be mapped.

The MGA 33 receives time separated position reports 25 from the data network 31 originating from each of the vehicles 2-1, . . . , 2-I.

MGA 33 includes a main board 64 which includes circuitry for powering and interfacing to a processing assembly comprising one or more onboard microprocessors or "CPUs" 65.

The main board 64 acts as an interface between CPUs 65 and an electronic memory assembly in the form of a secondary memory 77. The secondary memory 77 may comprise one or more optical or magnetic, or solid state, drives. The secondary memory 77 stores instructions for an operating system 69. The main board 64 also communicates with random access memory (RAM) 80 and read only memory (ROM) 73. The ROM 73 typically stores instructions for a startup routine, such as a Basic Input Output System (BIOS) or Unified Extensible Firmware Interface (UEFI) which the CPUs 65 access upon start up and which preps the CPUs 65 for loading of the operating system 69.

The main board 64 also includes an integrated graphics adapter for driving display 77. The main board 64 accesses a data communications assembly in the form of adaptor 53, for example a LAN adaptor or a modem, that places the MGA 33 in data communication with data network 31.

An operator 67 of MGA 33 interfaces with it by means of keyboard 79, mouse 51 and display 77.

Subsequent to the BIOS or UEFI booting up the server the operator 67 may operate the operating system 69 to load the Map Generator Program (MGP) 70. The MGP 70 may be provided as tangible, non-transitory, machine readable instructions 89 borne upon a computer readable media such as optical disk 87 for reading by disk drive 82. Alternatively, MGP 70 may also be downloaded via port 53.

As mentioned, the secondary memory 77, is typically implemented by a magnetic or solid-state data drive and stores the operating system 69, for example Microsoft Windows Server, and Linux Ubuntu Server are two examples of such an operating system.

The secondary storage 77 also includes the MPG 70, which configures the MGA 33 to implement a method for processing the position reports 25 to maintain and update a map 100 that comprises a dynamic navigational aid which is comprised of centers of clusters ("cluster centers" or more simply just "clusters") 102 that are derived from GPS points of the position reports and which are interconnected by directed connections. The connections correspond to paths for travel of vehicles in respect of a geographical area. Each cluster center has a position (corresponding to a point in the plane of the geographical area) and an orientation (corresponding to a direction from the cluster to a next cluster along a connection therebetween) associated.

During operation of the MGA 33 the one or more CPUs 35 load the operating system 69 and then load the MGP 70. Various portions of electronic memory of the MGA 33 are used during performance of the method including graph memory 72 which stores the graph that corresponds to map 100; Points Buffer 84, which stores vehicle positions (including location, timestamp and vehicle ID) retrieved from the incoming stream of position reports 25; Input Records batch Memory Area 86, which stores a batch of input records; and Connection Count Record memory area 88 which stores a count of the number of connections between clusters forming the vertices of the graph that corresponds to map 100.

It will be realized that the illustrated arrangement of the MGA 33 is simply one example of an environment in which MGP 70 can be executed. Other suitable environments are also possible, for example the program 70 could be executed on a virtual machine in a cloud computing environment to thereby implement a specially configured MGA.

Methods that are implemented by the MGA 33 under control of the MGP 70 in order to process the vehicle position reports 25 to maintain and update the map 100 will be described in the following sections of this specification. These methods are coded as machine readable instructions for execution by CPUs 65 which comprise the MGP 70.

I. Input Processing

Figure 6:
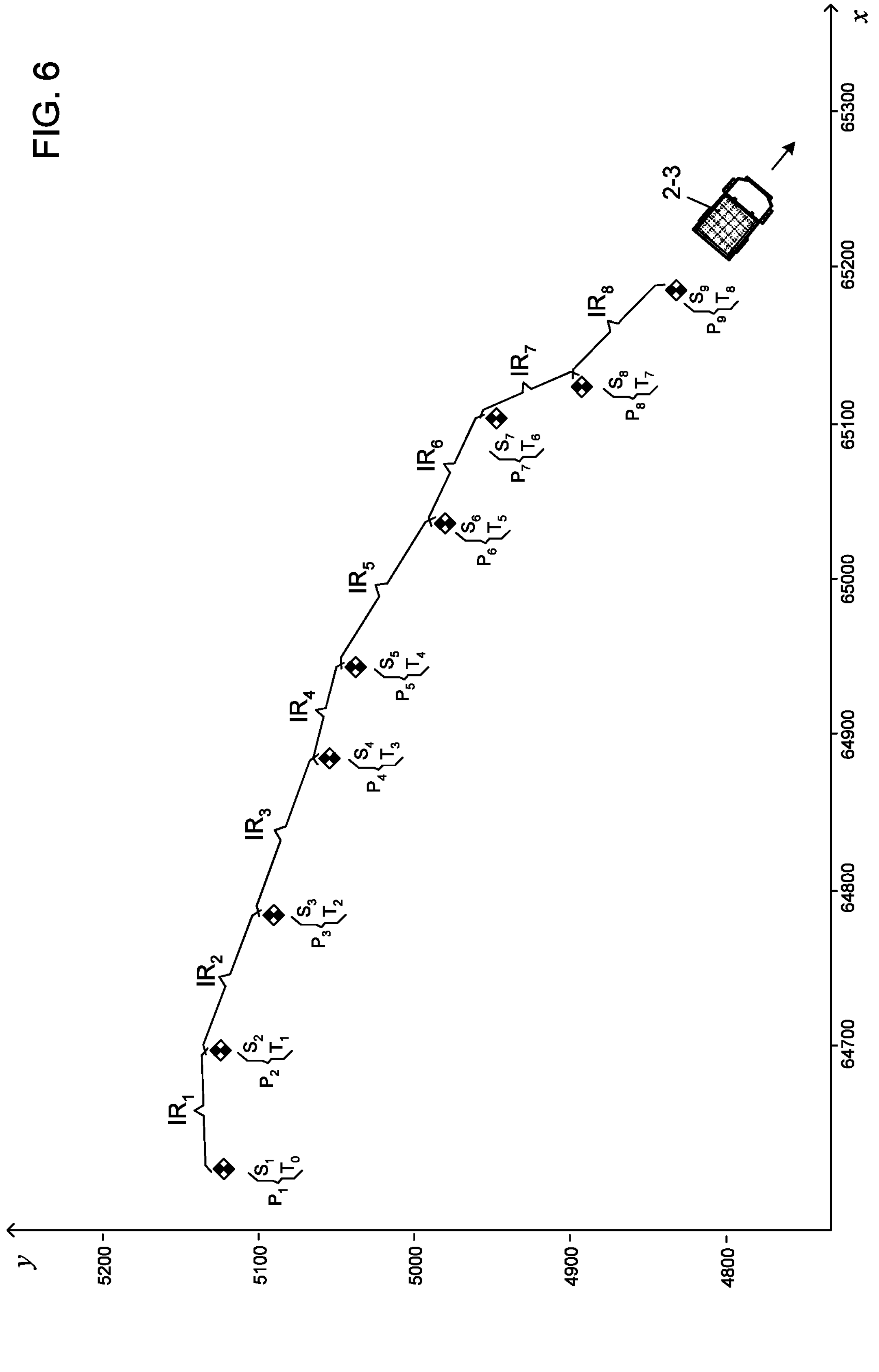
FIG. 6 is a graphical representation of GPS data points received in the course of travel of a vehicle and the pairing of the GPS data points to form input records containing source and target position pairs.

MAG 33 is configured by MGP 70 to accept a continuous stream of GPS data. FIG. 6 is a graph depicting GPS data points (shown as diamonds), received as position reports 25 across the data network 31 in respect of vehicle 2-3 operating in the geographical area of interest. Each position report contains information defining the GPS point including a timestamp and an x,y coordinate and an orientation of the vehicle at the time indicated by the timestamp.

MGA 33 forms consecutive points, e.g. P1, . . . , P9 into consecutive input records, IRn, where n=1, . . . , 8. Each input record consists of two timestamped GPS points which are consecutive GPS readings belonging to a vehicle. For Example, IR4 contains points P4 and P5.

Each input record IRn includes a source point, which is the first of the two points that the IRn is comprised of, and a target point, which is the second of the two points that the IRn is comprised of. For example, IR5 has a source point S5=P5 and a target point T5=P6.

The points are required to be consecutive GPS points of the same vehicle. This information is used to create connectivity and path information along the road map. Pairs must consistently reconstruct into paths. Thus, each GPS point, e.g. P1, . . . , P8, is only used as source point of a pair once. Also, each GPS point is only used as target point of a pair once.

Input records are expected to be in chronological order. Data from multiple vehicles is able to be presented in an interleaved fashion.

Figure 8:
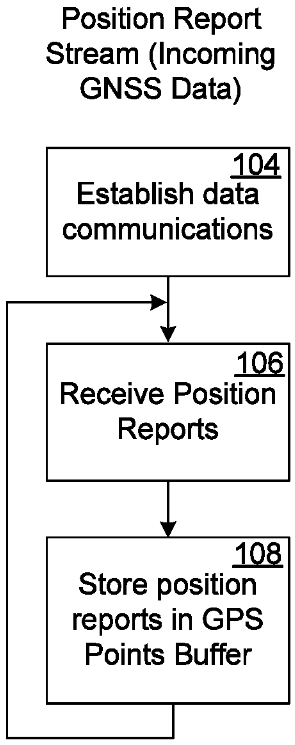
FIG. 8 is a flowchart of a method implemented by the MGA for receiving position reports from the data network and storing GPS points from them in a points buffer of the MGA.

Referring now to FIG. 8, initially, at box 104, MGA 33 operates modem 53 to establish data communications with data network 31. At box 106, position reports 25 are received in chronological order according to when they were generated. Each position report 25 contains GPS data in respect of one of the vehicles 2-1, . . . , 2-I, which have been respectively generated by the position trackers 32 of each vehicle. At box 108 the GPS points are stored in Points Buffer 84.

Figure 7:
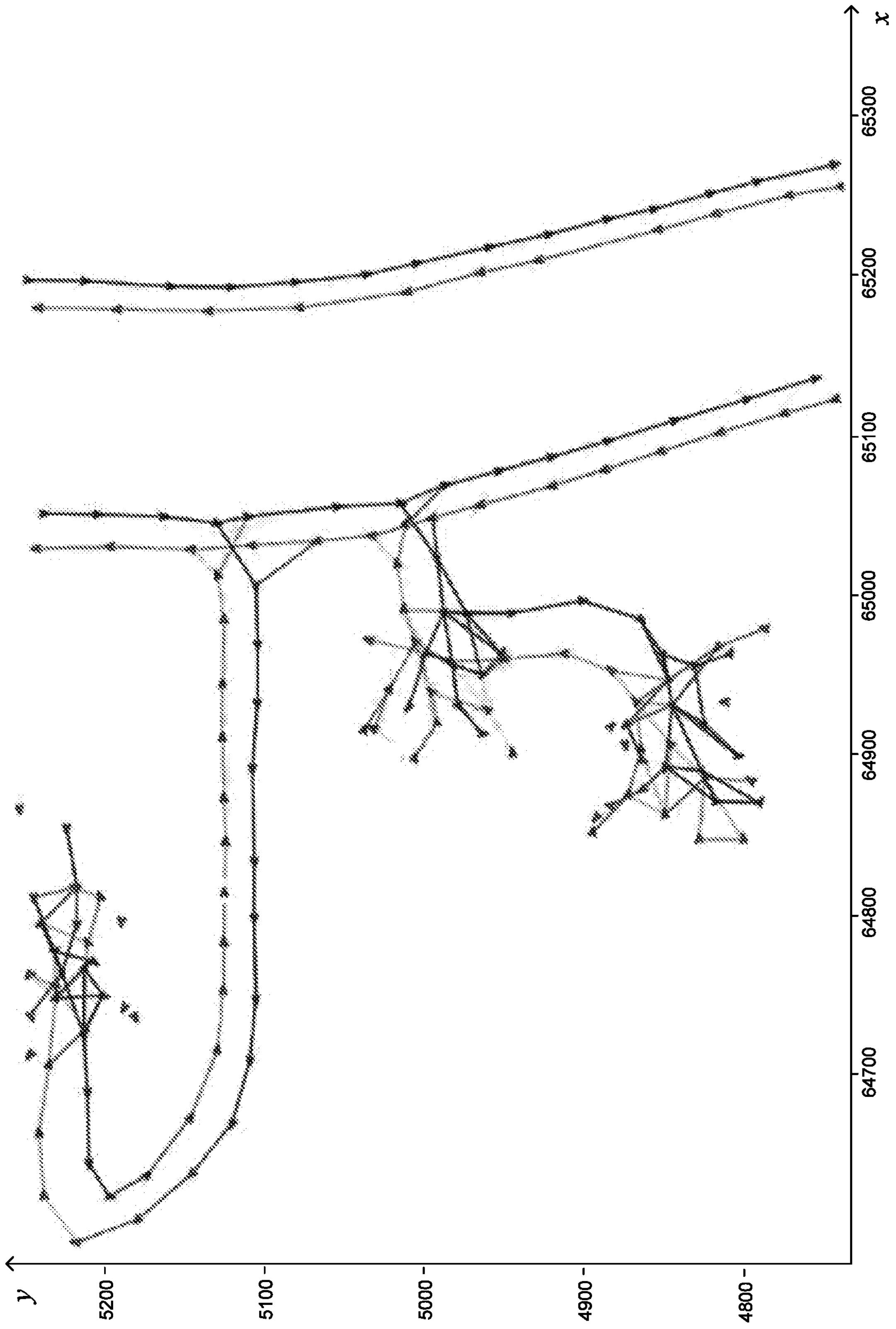
FIG. 7 is a graphical representation of a map generated by the MGA prior to a post-processing cleaning.

As will be discussed further, the GPS data is processed into input reports which are then used to incrementally build a road map, such as the map that is shown in FIG. 7 and, in theory, after each new input record is processed, an updated road map can be presented. However, running the entire map update for each input record has been found to be computationally expensive. Thus, in a preferred embodiment the method operates in rounds which process batches of GPS points at once. The batch size is variable and can be chosen arbitrarily.

At the beginning of each round, all available unprocessed input data is collected as one batch and processed in full to generate an updated map. As soon as the new map is generated, the next round begins. This method of batch-by-batch processing ensures that the procedure is able to keep up with the rate of incoming GPS data and at the same time maximises the frequency with which map updates are performed.

Figure 9:
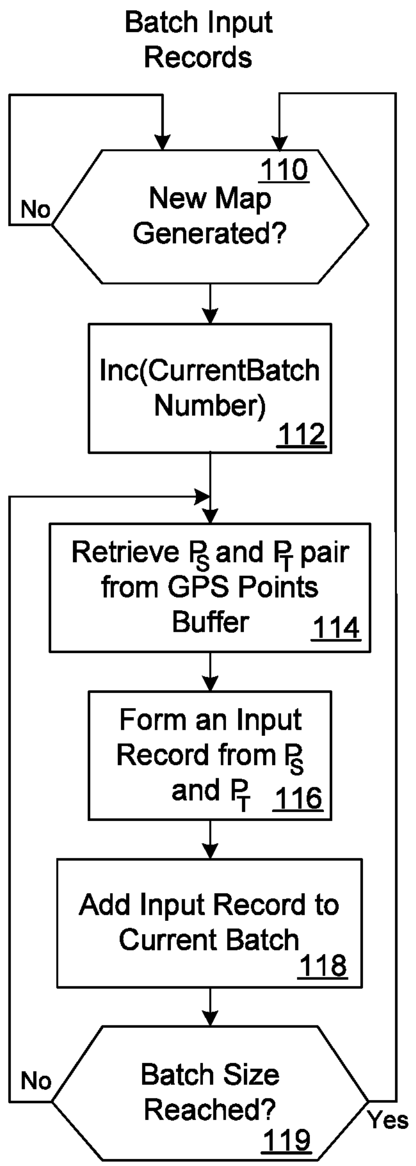
FIG. 9 is a flowchart of a method implemented by the MGA for creating a batch of input records containing position data for subsequent processing.

A method that the MGA 33 implements in order to process the points stored in Points Buffer 84 is illustrated in the flowchart of FIG. 9. At box 110 a check is performed to determine if a new map has been generated. Once it is determined that a new map has been generated then the next round begins and control proceeds to box 112 and a variable named CurrentBatchNumber is incremented to reflect commencement of the next round of batch processing. At box 114 the MGA 33 retrieves point pairs from the Points Buffer 84 and at box 116 it forms then into Input Records as previously discussed in relation to FIG. 6.

At box 118 the input record that has just been created is added to the current batch of input records stored in Batch Memory Area 86 (FIG. 5). At box 119, if the Batch Size, i.e. the maximum number of input records that are to be included in a batch, has not been reached then control diverts back to box 114. Alternatively, if at box 119 the condition that the Batch Size has been met is satisfied then control diverts back to box 110 and MGA 33 waits until the new map has been generated, by another processing thread, before preparing another batch of input records.

A map generation procedure by which MGA 33 generates and updates maps by processing the current batch of input records will be discussed in relation to the flowchart of FIG. 10.

Prior to discussing FIG. 10, some observations will be made on the overall procedure. One observation is that while the core map generation procedures operates solely on pairs of GPS traces, additional data sources are used as well as the position reports 25 that are just in respect of haul truck vehicles 2-1, . . . , 2-I. Positions of diggers and dumps, which are also in the stream of position reports 25 that MGA 33 receives, are used for tagging areas and the locations of digger buckets are used to detect demolition of roads. This information is received across network 31 in chronological order and interleaved with the GPS traces of the moving vehicles that are contained in the majority of the position reports 25.

Furthermore, the procedure is stateful in the sense, that internal data structures are maintained between rounds. Thus, the internal state must be preserved between consecutive map updates. This is achieved either by having a single process run continuously to generate the sequence of road maps or, alternatively, by storing a snapshot of the internal variables between runs. The latter requires significant overhead for storing and restoring the snapshot.

II. Processing Method

In overview of the preferred embodiment, in a first step, the MGA 33 groups GPS points from the position reports 25 grouped into clusters of points that share similar locations and orientations. A second step then updates the connections between the clusters to form a road network. According to embodiments the clusters and their positions are updated as new GPS points become available. Thus, care is taken of clusters that have moved and it is preferable to re-allocate GPS points to new clusters when appropriate. Subsequently, connections between clusters must be updated as well.

Adding a new GPS point can affect the position of multiple clusters and connections. Thus, doing a full update each time a new input record is added quickly becomes computationally expensive. Thus, multiple input records are added as a batch. This allows to first update the cluster positions and then run a single update pass for all affected connections. The resulting procedure saves both, on overhead and on the number of times individual connections must be updated, improving the scalability of the method.

Figure 10:
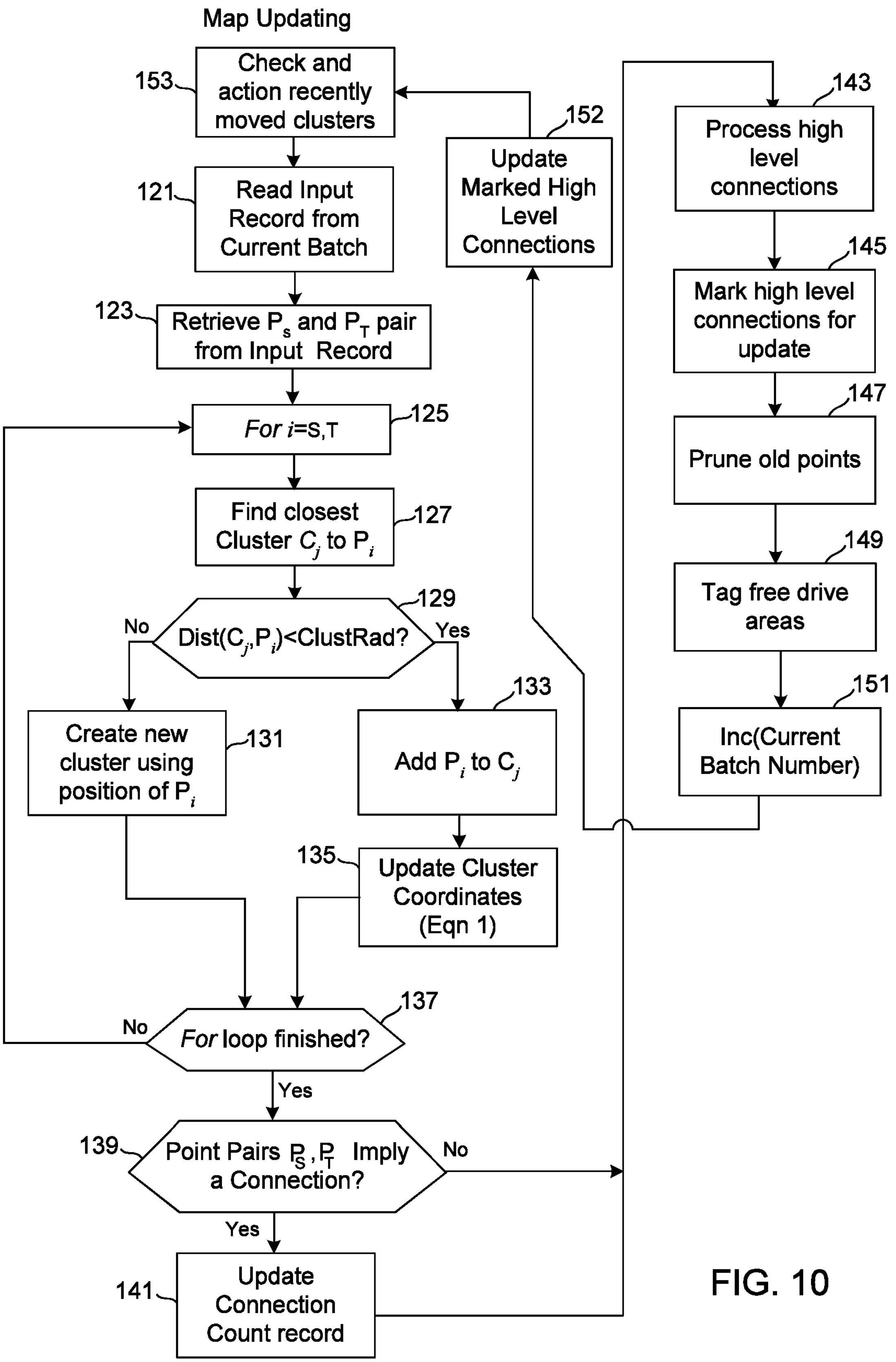
FIG. 10 is a flowchart of a method implemented by the MGA for generating and updating the map in response to a batch of input records.

Referring now to the flowchart of FIG. 10, at box 121 MGA 33 reads an input record from the Current Batch, which is stored in Input Records Batch Memory Area 86 of secondary memory 77. At box 123 the source point Ps and target point $P_T$ are retrieved from the input record. Boxes 125 to 137 comprise a "For" loop which first processes source point Ps and then target point $P_T$ to determine for each of $P_s$ and $P_T$, whether it should be added to an existing cluster of map 100 or whether it should be used to create a new cluster.

A. Clustering GPS Points

At box 127 MGA 33 finds the closest, i.e. "nearest", cluster to the point from the current input record that is being processed. Each cluster has three dimensional coordinates, two dimensions for the position on the plane and a third for its orientation. Distances between clusters and GPS points are measured using a weighted Euclidean metric with a weight allocated to the angular difference. For example, 1 degree may be set to equal 1 m, although other weights will also be workable.

When a new GPS point is added to the clusters, the closest existing cluster is identified (box 127). A test is performed at box 129 to determine if the closest cluster identified in box 127 is closer than a set cluster radius "ClustRad" (e.g. 30 m), if so then the point is added to the cluster at box 133. Otherwise, a new cluster with the position and orientation of the new point is created at box 131. If the point has been added to an existing cluster, i.e. at box 133 then, the position of the cluster is updated to be the average of its points at box 135. The update rule is:

$$C_{new} = C_{old} + \frac{P - C_{old}}{n_{new}} \quad (1)$$

where $C_{old}$ and $C_{new}$ are the old and new position of the cluster, P is the position of the newly added GPS point and $n_{new}$ is number of points associated with the cluster, including the newly added point P.

When cluster positions move, the assignment of points to clusters must be updated. Ideally, whenever a cluster has moved, all points associated with this or a neighbouring cluster must be checked. Unfortunately, this quickly becomes computationally expensive. Instead, points are only checked for re-clustering if a cluster has moved by more than a threshold (e.g. a cluster move threshold of 1/10 of the cluster radius may be used).

Figure 10A:
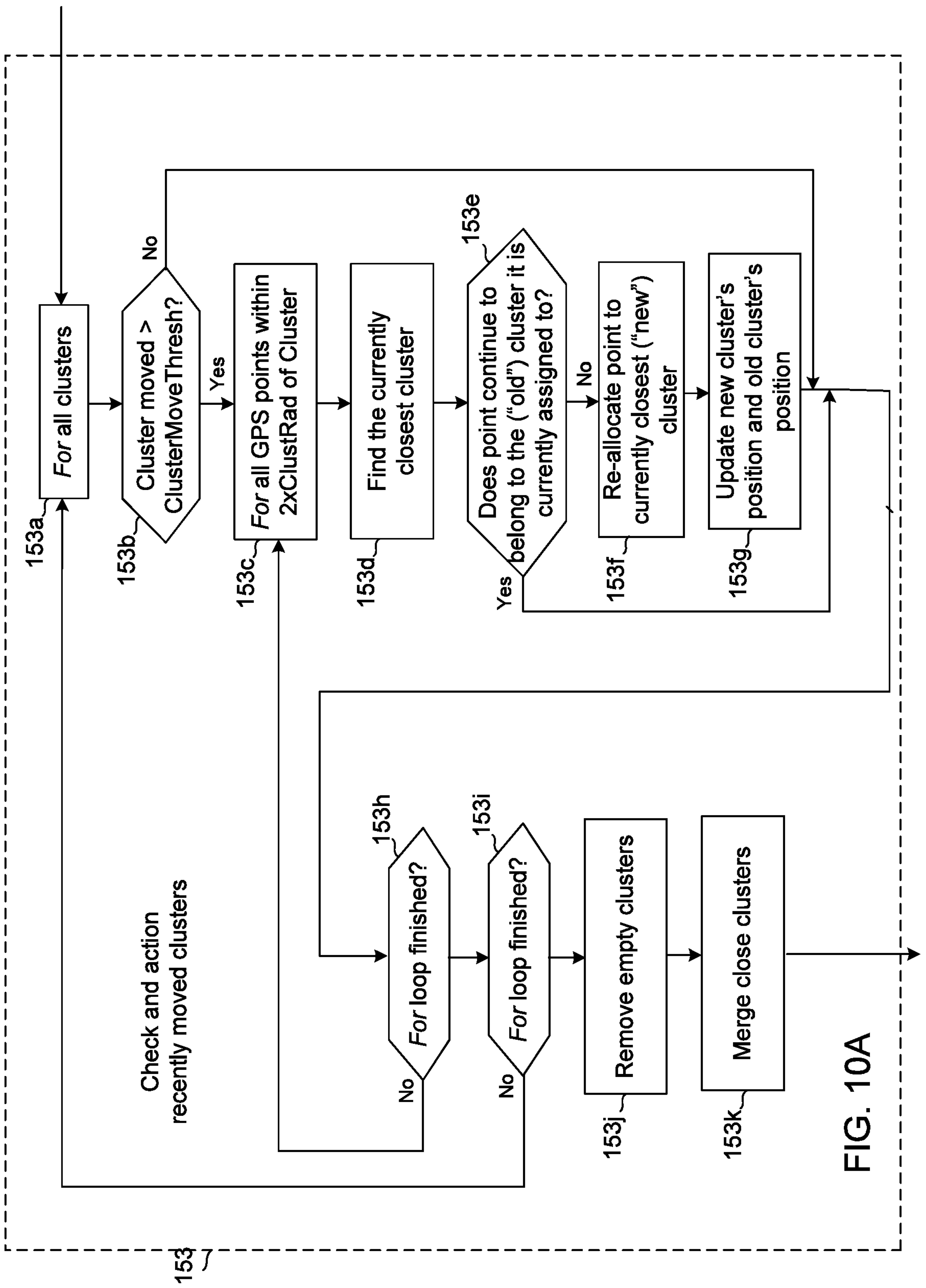
FIG. 10A is a flowchart of a method implemented in box 153 of the flowchart of FIG. 10.
Figure 11A:
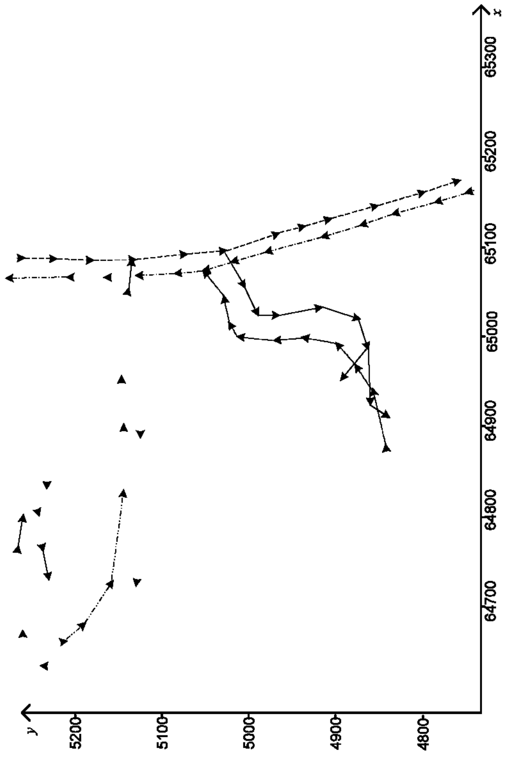
FIGS. 11A to 11H progressively illustrate map creation in response to new position reports for the vehicles being received over the data network.
Figure 11B:
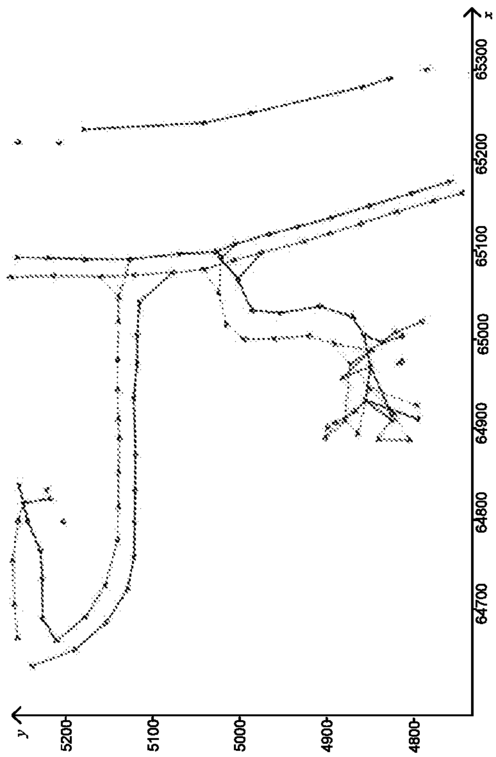
Figure 11C:
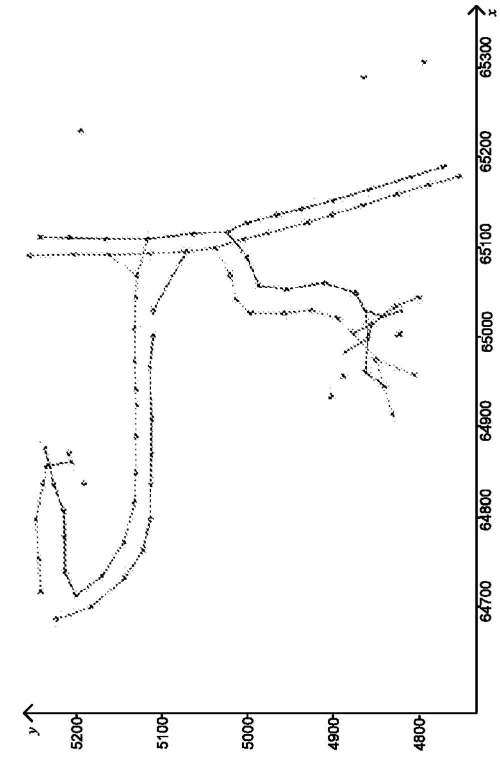
Figure 11D:
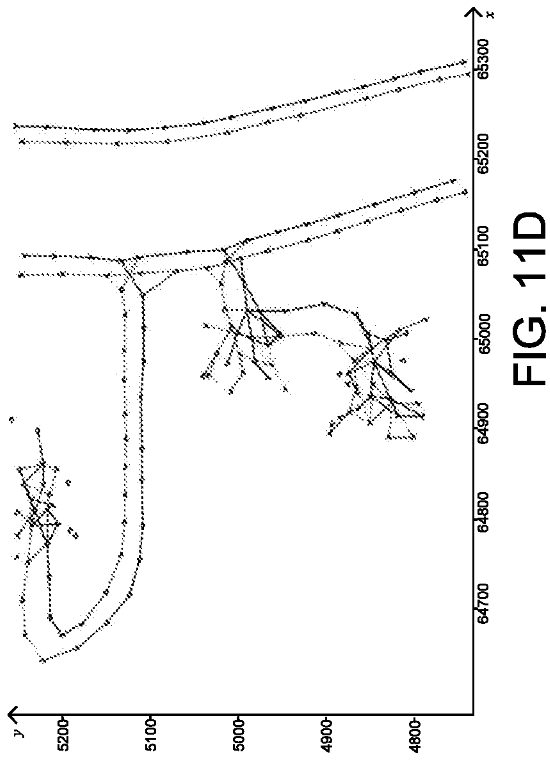
Figure 11E:
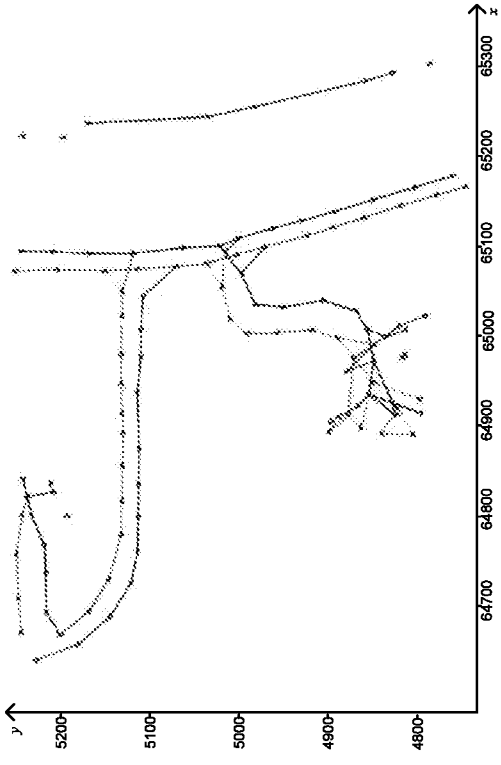
Figure 11F:
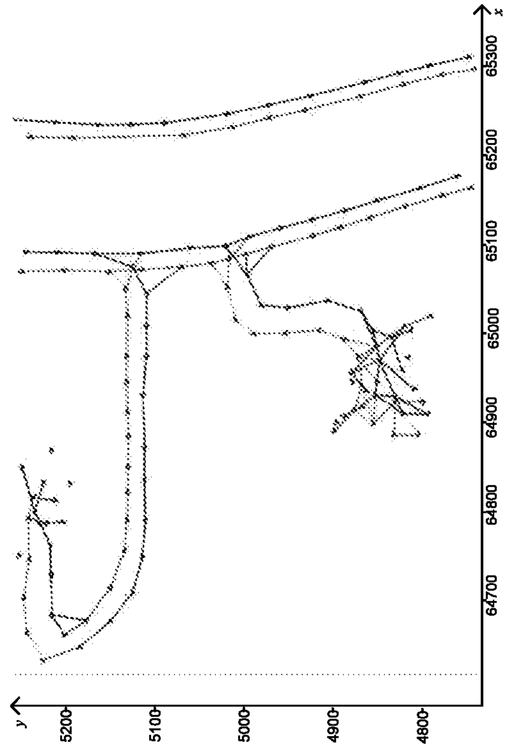
Figure 11G:
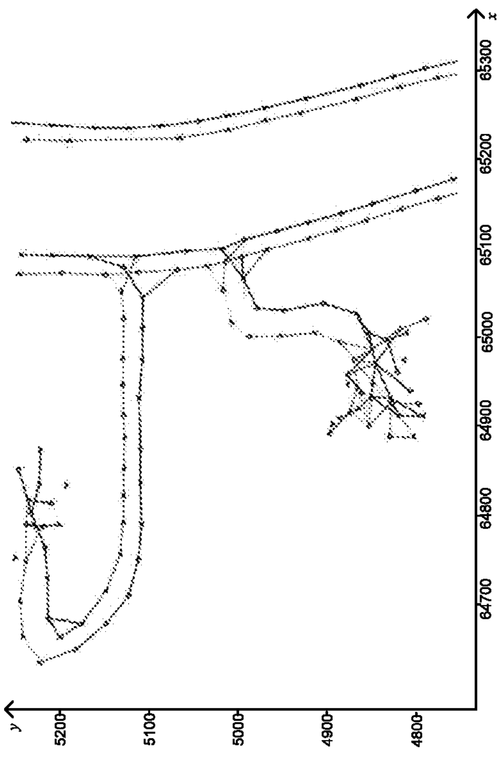
Figure 11H:
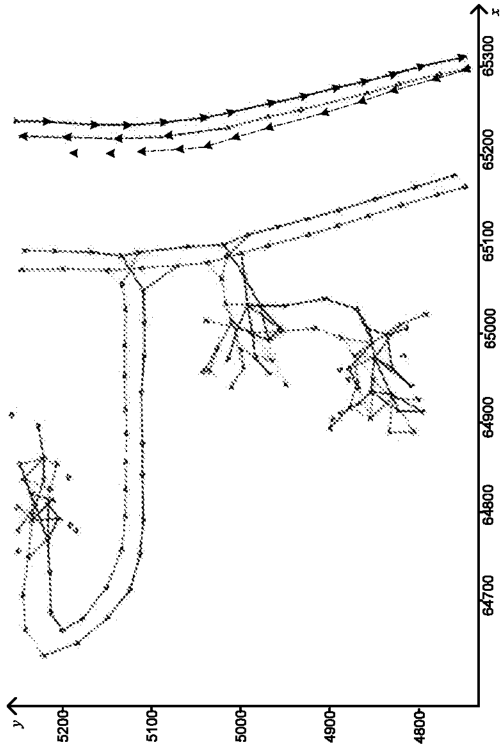

Prior to commencement of each round, before the new GPS points are added, all clusters are checked for recent movement (box 153). FIG. 10A is a flowchart of the steps that are carried out at in box 153 of FIG. 10. At box 153*a* an outer For loop commences for processing all of the clusters comprising the map in the subsequent boxes 153*b*-153*g*. At box 153*b* that the current cluster in the outer For loop is processed to determine if the previous processing at box 135 caused the current cluster to move by more than a predetermined threshold value stored in constant ClusterMoveThresh. If the condition in box 153*b* is met then control proceeds to box 153*c*. At box 153*c* an inner For loop commences for each of the points that are within a distance of two cluster radiuses of the current cluster. In a first processing box 153*d* of the inner For loop a cluster that is currently closest to the point is found. At condition box 153*e*, a check is performed to determine if the current point continues to belong to the cluster that it is currently allocated to, which may be referred to as its "old" cluster. If it is found that the current point does continue to belong to its old cluster then control proceeds to box 153*f*. In the alternative control proceeds to condition box 153*h* of the inner For loop. At box 153*f* the current point is reallocated to the currently closest or "new" cluster and at box 153*g* the position of the new cluster and the position of the old cluster are updated to take into account the change in the allocation of the current point. If a point no longer belongs to the cluster it is currently allocated to (i.e. its "old" cluster) then it is re-allocated. Whenever a point is removed from a cluster, the cluster's position is updated using $$C_{new} = C_{old} - \frac{P - C_{old}}{n_{new}} \quad (2)$$

Re-allocating points between clusters causes clusters to move and thus can require further re-allocations. If re-clustering causes the cluster to move more than the threshold, it is simply processed again in the next round.

Also, at box 153*j*, empty clusters are removed and clusters that are too close together (e.g. closer than 15 m) are merged at box 153*k*. When merging clusters, all points of one cluster are added to the other. Afterwards, all affected points are scheduled to be checked for re-clustering, regardless of how much the center of the remaining cluster has moved in the process.

B. Creating Connections

As previously discussed, input records, e.g. IR1, . . . , IR8 of FIG. 6, consist of two consecutive GPS points. Once both points have been allocated to clusters this gives rise to connections between clusters.

Thus, when the MGA 33 allocates points to clusters it keeps a count in the connection count record 88 (FIG. 5) as to how many of the points in a cluster stipulate a connection between any two clusters. If there are point pairs inducing a connection between two clusters (box 139), the connection is created and maintained (box 141). Once the count for the connection goes back to zero, the connection is removed from the connection count record 88. The latter usually happens when a cluster moves and subsequently, the target points are shifted to another cluster effectively resulting in the connection following the point.

If the sampling rate of GPS points is low, two consecutive GPS points may not belong to neighbouring clusters. Instead, clusters are skipped. Naively adding direct cluster connections results in artefacts in the form of a multitude of parallel roads which form a poor-quality map. Thus, at box 143, the sequence of skipped clusters is identified to create a series of connections of neighbouring clusters. To distinguish the different kinds of cluster connections, the term high-level connection refers to a connection induced by consecutive GPS points whereas the term low-level connection refers to a connection created as a result of finding a sequence of intermediate clusters as described here. The series of updated road maps 23 that are returned to the user, e.g. Task Assignment Allocator 55 (FIG. 4) contain low-level connections.

Different strategies for creating a cluster intermediate sequence that turns a high-level connection to a series of low-level connections may be used: Chord Angle Filtering, Dubins Path Sequence and Gravity Rubber Banding. Common to all methods is, that a set of candidate clusters is selected upfront based on a crude spatial rule: the mid-point between the two clusters to connect is identified. All clusters within a circle around that midpoint that passes through the start and end clusters are considered as candidates for intermediate clusters in the connection sequence. Limiting the search space this way reduces the complexity for finding connections to a tractable level. The actual methods for finding cluster sequences are detailed in Section III.

C. Updating Connections

As more input records are processed, new clusters are created, existing clusters move and points are re-allocated between clusters. All of these events have the potential for connections to change.

Changes that result from GPS points moving between clusters are processed immediately. As the aforementioned connection counter drops to zero the old high-level connection is dropped and if needed, a new one is created elsewhere.

Adding new clusters or moving existing ones may also affect the sequence of intermediate clusters of existing high-level connections that do not directly connect the clusters that have changed. However, re-calculating all connections after every change quickly becomes too computationally costly. Thus, high-level connections that are potentially affected by new or moved clusters are identified and marked for update (box 145). At the end of each round all marked connections are updated by re-calculating the sequence of intermediate clusters (box 152).

For each connection, the relevant workspace is added to an R-tree based spatial index which is an efficient spatial index for fast lookup of nearby clusters. Ideally, the workspace is the circle around the midpoint as previously described in Section II-B. However, for implementation reasons, a square is fitted around the circle and added to the index. Whenever a new cluster is created or an existing cluster moves further than the update threshold, MGA determines all affected connections are determined from the spatial index and marks them for an update (box 145).

D. Pruning Old Points

For continuous operation, GPS points must regularly be removed from memory of MGA 33. This is often the case when information about removal of a road becomes available, but points must also be pruned routinely (box 147) to keep the amount of data that has to be kept in memory within manageable levels.

The MGA 33 removes a point from its cluster the same way that the re-clustering operation previously described in Section II-A is performed. However, instead of adding the point to another cluster, the point is dropped and all information associated with it is deleted as well.

I) Removing Destroyed Roads: When information arises, that a certain geometric area does not contain a road, all GPS points within this area are removed from map 100. Such geometric removal of roads can either happen due to user input or automatically by evaluating additional data sources.

MGA 33 uses bucket data to determine that a road has been removed. Whenever an excavator extracts a bucket of material, it is assumed, that this area is no longer driveable and MGA 33 and all GPS points within a small radius (e.g. a radius of 10 m for buckets) are removed. To avoid issues with removing recent GPS data, e.g. due to falsely recorded buckets or buckets that were recorded due to clean up operations, points that are very new (e.g. preferably points that are newer than 30 minutes are kept) are excluded from removal.

I) Culling Redundant and Old GPS Points: the MGA 33 keeps all raw GPS points to allow for dynamic re-clustering and refinement of roads at any time. A consequence of this is, that MGA 33 has to keep an increasing amount of data in memory and will suffer scaling issues if run indefinitely. Thus, it is desirable to cull points that are no longer needed to keep the amount of data within manageable limits.

A simple approach is to set a fixed number of points that are allowed and strictly remove the oldest GPS points whenever the capacity is exceeded. While this method is effective to prevent memory issues, it ignores that points along heavily travelled roads can be removed earlier due to an abundance of data whereas points belonging to rarely travelled roads should be kept longer. This is especially the case if some roads are dormant for extended periods of time.

Instead of removing old points purely by age, points are removed such that connectivity between clusters is preserved. For this, all clusters are checked periodically for points that can be removed from the system without impacting cluster connectivity.

Points belonging to a cluster are processed by age with oldest points being processed first. This biases the removal heuristic towards keeping more recent points in favour of older ones. For each point, the trace of GPS points is followed in both directions until the trace ends or reaches another cluster. If another cluster is reached, the high-level connection between the clusters is examined and the corresponding low-level connection to the next cluster is identified. It is then counted, how many GPS point pairs contributed to the low-level connection and the count is set as the weight of this low-level connection.

If the connection weight is larger than a set threshold (e.g. set the connection weight threshold to 10) it is flagged for removal unconditionally of its age. This result is a reduction of points that are kept for heavily travelled roads. Otherwise, the trace is flagged for removal if $$\text{path age} \geq \min(t_{max}, (1+cw)t_{min}) \quad (3)$$

where w is the connection weight, $t_{min}$ and $t_{max}$ are minimum and maximum pruning ages (e.g. set min and max pruning ages to 12 hours and 30 days) and c is a tuning parameter (e.g. set c=0.1). The intent of Eq. (3) is to quickly remove roads that were only travelled very few times, for example if a single vehicle performed an unusual manoeuvre or there was a temporary disturbance that caused a few vehicles to behave in an unusual fashion. However, the more vehicles have travelled a road, the longer it should be kept until it is removed. If a road hasn't been used for a time of $t_{max}$, it is always removed from the map.

A GPS trace through a cluster usually results in two connections to neighbouring clusters. In this case, the trace is removed if both connections result in the path being flagged for removal. In case the trace does not result in any connections, it is removed if it is older than $t_{min}$.

After a trace has been processed (and potentially removed), the remaining GPS points of the cluster are processed, skipping those that were already processed as part of another GPS trace.

FIGS. 11A to 11H show map 100 in progressive stages as MGA 33 incrementally updates the underlying graph corresponding to map 100 which is stored in graph memory area 72.

III. Finding Intermediate Cluster Sequences

As previously mentioned in Section II-B, a sequence of intermediate clusters must be determined (box 143) to turn a high-level connection between two clusters into a series of low-level connections suitable for the final road map. For computational tractability, the search for intermediate clusters is restricted to a limited workspace which is determined by a circle around the midpoint between the two clusters connected by the high-level connection. Of the three methods presented here, Chord Angle Filtering and Dubins Path Sequence operate only on the cluster positions, resulting in fast computations whereas Gravity Rubber Banding takes into account the locations of individual GPS points, requiring vastly more computational effort. A performance comparison between the three methods is presented in Section VI-B

A. Chord Angle Filtering

Based on an idea by Ni et al. [2]a, a shortest path between clusters is searched for using a metric that penalises long edges and rewards multiple shorter connections. Here, the cost to go between way points is quadratic compared to the Euclidean distance. This favours paths that take a small detour to pass through intermediate way points Using this metric, a shortest path between the clusters is searched for using Dijkstra's procedure. To avoid connecting to clusters that do not give rise to a reasonable path, clusters are filtered depending on whether their heading seems reasonable for an intermediate way point. The filter heuristic works as follows: the angle of the straight-line connection between the current cluster in the Dijkstra search and the goal is calculated. If the heading of the next cluster has a similar angle (e.g. seat the tolerance to 30 degrees), it is accepted as a neighbour of the Dijkstra search, otherwise it is rejected.

B. Dubins Path Sequence

The Dubins method also uses the principle of a quadratic cost to go between way points However, instead of explicitly rejecting clusters with an inappropriate heading, the heading is incorporate by assuming Dubins Paths [3] between way points. Thus, the cost to go from one cluster to another is set to the square of the length of the shortest path a forward moving vehicle with a given minimum turning radius (e.g. assume a turning radius of 10 m) can follow. Then, a shortest path between the clusters is searched for using Dijktra's procedure.

C. Gravity Rubber Banding

To identify intermediate clusters, the high-level connection between two distant clusters is treated as a rubber band which is pulled towards nearby GPS points by a kind of gravitational force. By pulling it towards nearby GPS points, the connection is likely to pass close to the intermediate clusters that belong to the same road segment allowing for correct connections.

When clusters are to be connected the connecting line is subdivided by equidistant points ($p_0, \ldots, p_n$) where $p_0$ and $p_n$ are the positions of the clusters to connect. n is chosen as small as possible such that the spacing which is at most equal to half the cluster radius as defined in Section II-A. Then several iterations of gravitational forces and spring forces are applied to the intermediate points $p_1, \ldots, p_{n-1}$ to better approximate the shape of the road. Note, that the forces are not simulated to be physically correct gravitational and spring forces, but named for their general effect.

Gravitational forces are applied to each point. For this, all GPS points $q_1, \ldots, q_m$, with a distance of at most half the seed radius r and a heading difference of at most 20° are considered. The force that $q_j$ acts on $p_i$ is set to be orthogonal to the vector $\overrightarrow{P_{\iota-1}P_{\iota+1}}$. The magnitude of the force is set to $$C\frac{r - |p_i q_j|}{r * m}$$

where c is a scaling parameter which determines how strong the forces are to be applied. Here, it is set to c=2. In formulas, the gravitational forces can be calculated as follows:

$$l_{ij} = \frac{\overrightarrow{p_{l-1}p_{l+1}}\,\overrightarrow{p_l q_J}}{|\overrightarrow{p_{l-1}p_{l+1}}|^2} \quad (4)$$

-continued $$F_{ij} = c\frac{r - |\overrightarrow{p_i q_j}|}{rm}\frac{\overrightarrow{p_i q_j} - l_{ij}\overrightarrow{p_{i-1}p_{i+1}}}{|\overrightarrow{p_i q_j} - l_{ij}\overrightarrow{p_{i-1}p_{i+1}}|} \tag{5}$$

$$F_i^{gravity} = d\Sigma_{j=1}^{m} F_{ij} \tag{6}$$

In addition to the gravitational forces which are orthogonal to the span, a rubber band force is applied parallel to the span. Its purpose is to maintain equal spacing between the points by moving each point $p_i$ towards the middle between $p_{i-1}$ and $p_{i+1}$. It is calculated as $$F_i^{rubber} = d\frac{\overrightarrow{p_{i-1}p_{i+1}}}{|\overrightarrow{p_{i-1}p_{i+1}}|} \tag{7}$$

if $p_i$ is closer to $p_{i-1}$ and the inverse force is taken if $p_i$ is closer to $p_{i+1}$. The scaling factor d is set to d=1. The position of each point is then updated by:

$$p_i^{new} = p_i + F_i^{gravity} + F_i^{rubber}. \tag{8}$$

In the experiments shown here, fifteen rounds of applying forces are performed. After this step, each point is associated with its closest cluster and the sequence of clusters is connected by low-level connections.

IV. Tagging Areas

Figure 12:
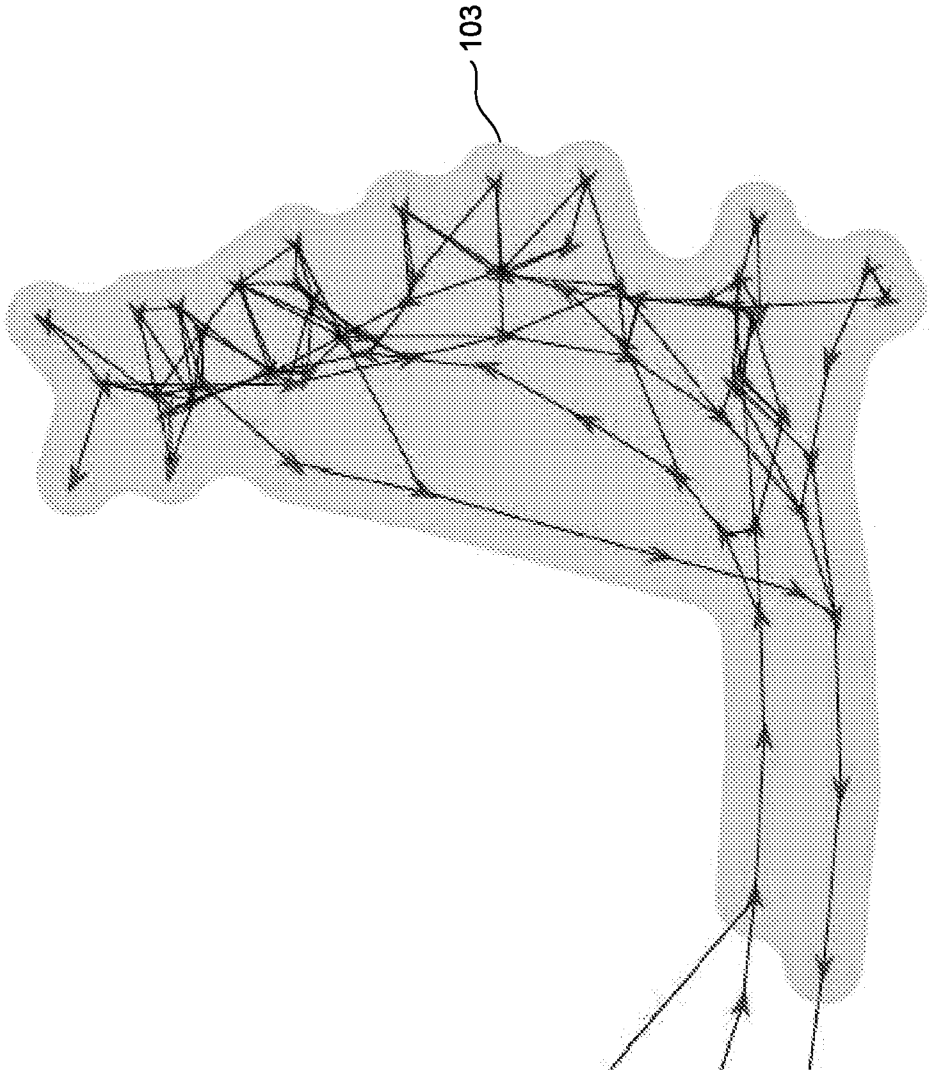
FIG. 12 depicts a tagged area of a map.

Road networks may contain locations that are not strictly roads as such but are more aptly described as free drive areas. Such areas could be car parks, loading/unloading areas or, in a mining context, benches and stockpiles. Generating a road map in such areas tends to perform poorly since procedures attempt to create a maze of roads based on where vehicles have gone in the past. The shape of this maze is no longer usable for navigation and only consists of a dense network of artefacts, the nature of which depend more on the procedure than the road network. An example of such a situation, which includes a tagged area 103, is shown in FIG. 12. Subsequently, at box 149 the MGA 33 identifies and explicitly marks such areas so they can be included as such into the final road map.

While the shape of the area is not known upfront, the approach taken here assumes that it is possible to identify one point that is within the area each time a vehicle visits an area. This is realistic if the areas serve a purpose such as loading or unloading and these actions can be observed. Then, whenever such an event occurs, the vehicle can be assumed to be within the relevant area and the corresponding GPS point is tagged accordingly. Tags of GPS points are then propagated along the path of the vehicle.

Whenever a GPS point is tagged, the tag is propagated along the path it belongs to. GPS traces along the path of the vehicle are traversed both forwards and backwards up to a set travel distance and time delta (e.g. propagate tags a maximum of 200 m and 60 seconds). All GPS pairs within the limits are tagged unless they already contain a tag. If the point to tag is newer than the allowed time delta, new GPS data that arrives afterwards and within the time delta is also checked and tagged appropriately to ensure the forward propagation works as intended. Note, that the tagging of paths tags GPS pairs, not individual points. The reason is, that GPS pairs give raise to connections between clusters which are more representative of a path than a cluster itself.

The tagging described so far operates on the low-level GPS paths. To lift this to tags of the map, a voting scheme is used. Each GPS pair that belongs to a high-level cluster connection counts as one vote for the resulting tag of each of the associated low-level cluster connections. Pairs that are not tagged are counted as a vote to leave the low-level connection untagged. The low-level connection then assumes the tag that has the most votes or remains untagged if the most votes are cast for being untagged.

V. Post Processing

While the main aspects of the road network such as the clusters and their connectivity are updated continuously as data is added to the system, it is advantageous to leave other parts of the map generation until a road map 23 (FIGS. 4, 5) is generated for distribution back over the data network 31. These steps have in common, that they operate on the road map as a whole and are computationally cheap. Thus, they can be performed anew each time a user wants to receive the current road map, 23 from MGA 33. The post-processing steps are performed in the order they are described here.

A. Trimming Tagged Areas

Tagged areas are identified by the voting mechanism on low-level cluster connections described in Section IV. However, using the voting mechanism alone leads to areas extending on the roads depending on how far a tag was propagated. This is unlikely to yield the desired result as it is sensitive to precise tuning and different areas are likely to require different values. FIG. 2*a* shows an example of an area that undesirably spreads into the next intersection. Thus, the final extent of the area is determined during post-processing.

The basic idea behind area marking is, that areas that allow for driving freely exhibit a multitude of paths that split and join and form a multiply connected graph whereas roads leading into areas tend to form simple lines. The processing is performed individually for each area. Thus, in a first step, the voting system of Section IV is employed to create one sub-graph of the road map per area and these sub-graphs are then trimmed. The sub-graphs are created by considering the low-level connections between clusters. Whenever a low-level connection is determined to be part of an area, the connection as well as its source and target clusters are added to the subgraph belonging to the area. Note, that this can lead to the rare case that a cluster is part of several of the sub-graphs if it has connections belonging to different areas.

Once all sub-graphs are formed, they are trimmed to remove the parts that belong to roads leading to and from the area. For this, all vertices that correspond to a cluster that contains at least one GPS point that was originally tagged before tag-propagation are marked as seeds. The seeds are always considered to be part of the area and will not be deleted. Then, all vertices that are not seeds and have a degree of one are deleted. This is repeated until no further vertices can be deleted. The remainder of the graph forms the area.

Figure 13:
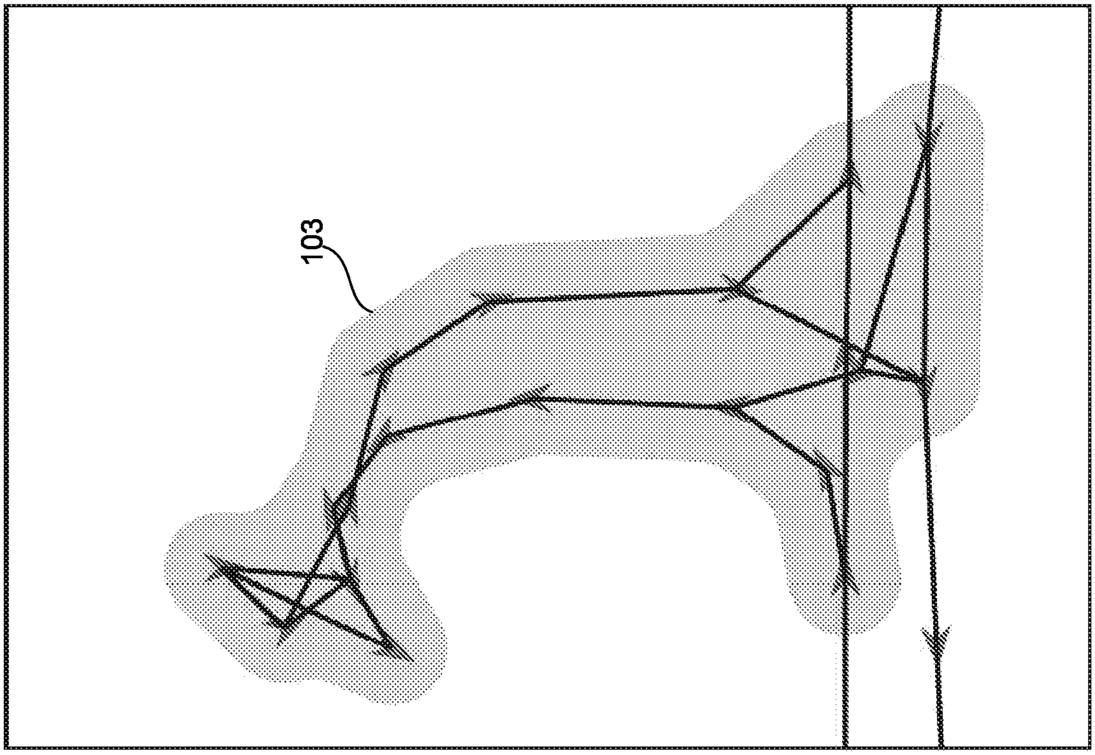
FIG. 13 depicts a tagged area of a map before implementation of a trimming procedure by the MGA.
Figure 14:
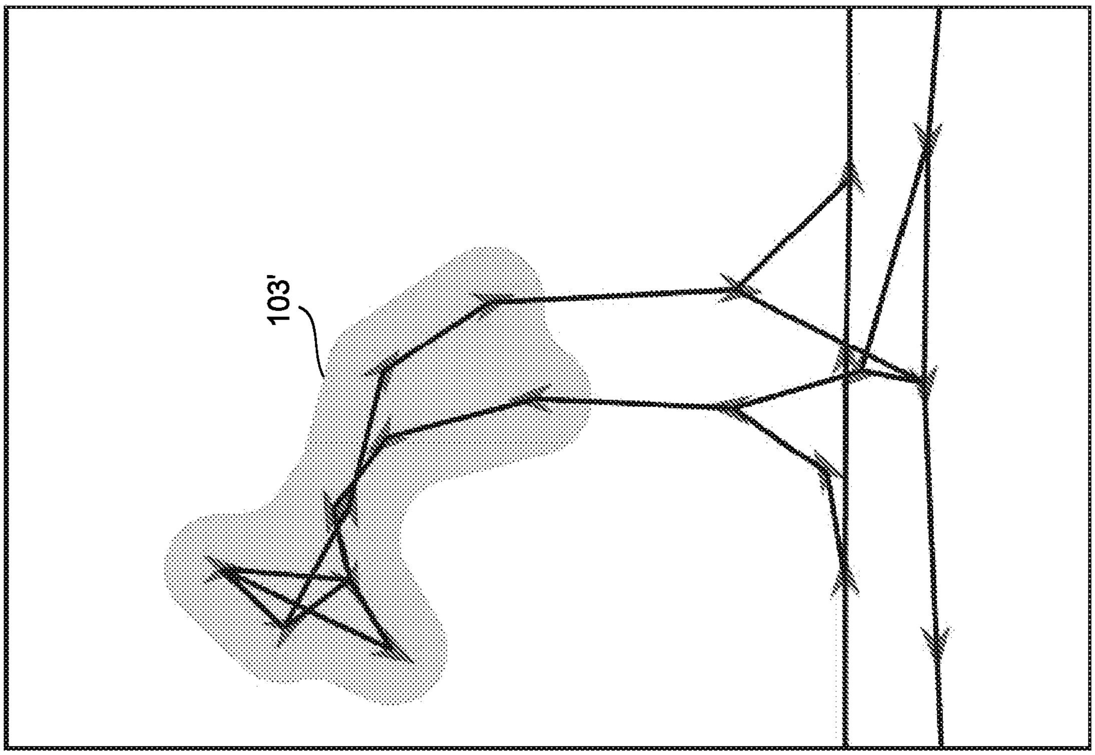
FIG. 14 depicts the tagged area of the map of FIG. 13 after implementation of the trimming procedure.

To get a geometric representation of the area, the geometric representation of the area graph is inflated (buffered): all points of the plane that are within a certain distance (e.g. inflate area by 10 m) of one of the graphs vertices or edges is considered to be part of the area. If the resulting geometry has holes, these are filled. While the resulting shape is not technically a polygon due to round edges, it can be approximated by an appropriate discretisation. An example of an area before (tagged area 103) and after (tagged area 103') trimming is shown in FIGS. 13 and 14.

B. Improving Multi-Path Connections

Figure 15:
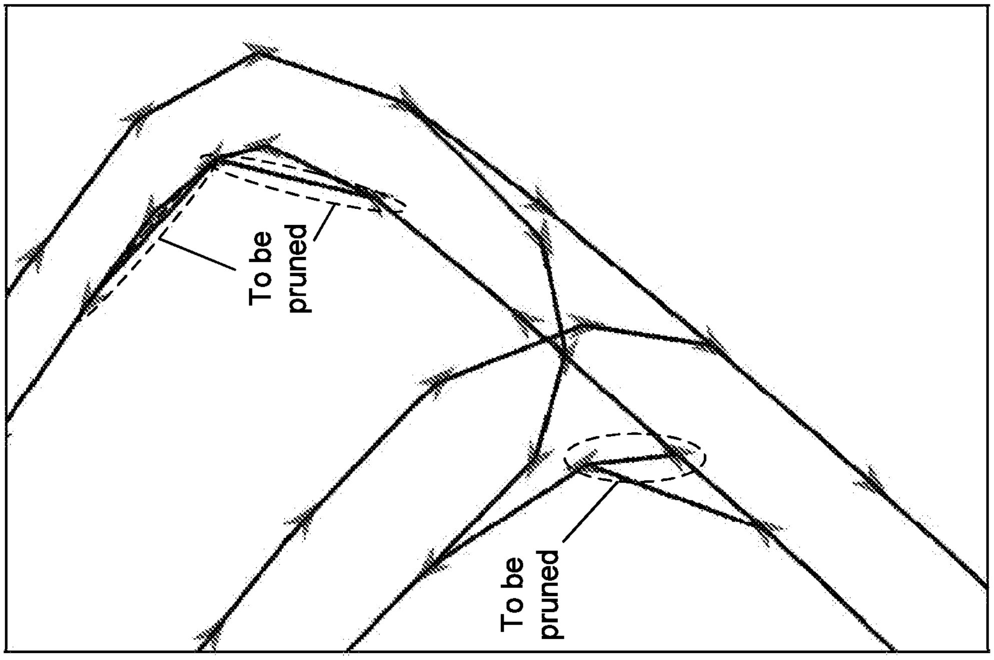
FIG. 15 depicts a section of the map before implementation by the MGA of multipath corrections to prune superfluous connections.
Figure 16:
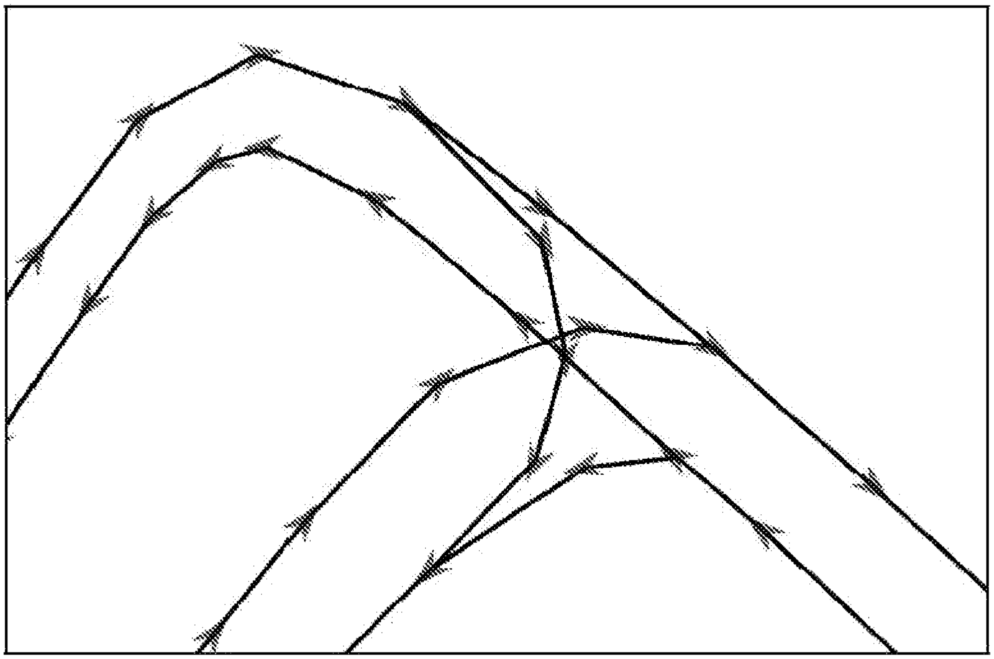
FIG. 16 depicts the section of the map of FIG. 15 after implementation of multipath correction by the MGA to prune superfluous connections identified in FIG. 15.

Ideally, the method of creating low-level cluster connections from high-level connections as described in Section II-B results in clean paths without multi-path artefacts. Unfortunately, however, this doesn't always work as expected and multi-path artefacts are observed occasionally, an example of which is shown in FIGS. 15 and 16. These artefacts are identified during postprocessing and redundant connections are omitted from the final road map. All operations within this section are on low-level connections only.

The multi-path improvement step is executed after the tagged areas have been identified and pruned as described in Section V-A. All clusters that are part of a tagged area are ignored because within areas road map inference is not expected to perform well since roads aren't well defined.

Search for multi-path connections that can be cleaned up begins at a cluster that is not part of a tagged area and has at least two outgoing connections to other clusters. From the initial cluster, a depth-first-search of the neighbourhood is performed on the directed graph.

The search is limited in depth (e.g. set maximum path length for search to four edges) and paths are grouped by the vertex they reach. Such a group is considered for multi-path pruning if: (i) it contains more than one path, (ii) not all paths in the group have the same cluster as second vertex, and (iii) not all paths in the group have the same cluster as second last vertex.

Within each group, the strongest path is identified. For this the strength of the low-level connections contained in the paths is calculated by counting the number of GPS pairs that have the low-level connection as part of their cluster sequence. Then paths are ranked by the strength of the weakest low-level connection contained in the path. In case of a tie, the average strength along the path is used as a tie breaker and if the tie remains an arbitrary choice is made.

For each group the strongest path is kept while the low-level connections of all other paths are checked for deletion. A low-level connection is deleted if (i) all outgoing paths of the connection's target cluster traverse only paths of the path group until they reach a cluster of the strongest path and (ii) all incoming paths of the connection's source cluster traverses only paths of the path group and came from a cluster of the strongest path. Thus, the deletion of a low-level connection never results in the removal of connections that are needed to reach parts of the road map outside the path group.

Once all path groups have been processed, a new initial cluster with two outgoing connections is chosen. This process is repeated until all suitable initial clusters have been used. An example of such a clean-up process is shown in FIGS. 15 and 16.

Note, that because this is a post-processing step, the low-level connections that are deleted here are only deleted with respect to the output created at this very instance. The persistent state of the Streaming Map Generation SMG is unaffected by this and all connections are kept for future road maps.

C. Identifying Intersections

Since directional lanes are treated as individual roads, intersections show up in the road network as a group of individual splits (vertices with out-degree >1) and joins (vertices with in-degree >1). For operational reasons, it can be desirable to mark intersection areas as such and group low-level splits and joins that belong to the same intersection. SMG identifies intersections though two simple observations about the structure of intersections: (i) a split or merge that belongs to one lane usually has a corresponding split or merge on the other lane which can be identified through spatial analysis, and (ii) a split in a lane usually leads to joins following shortly after.

Figure 17:
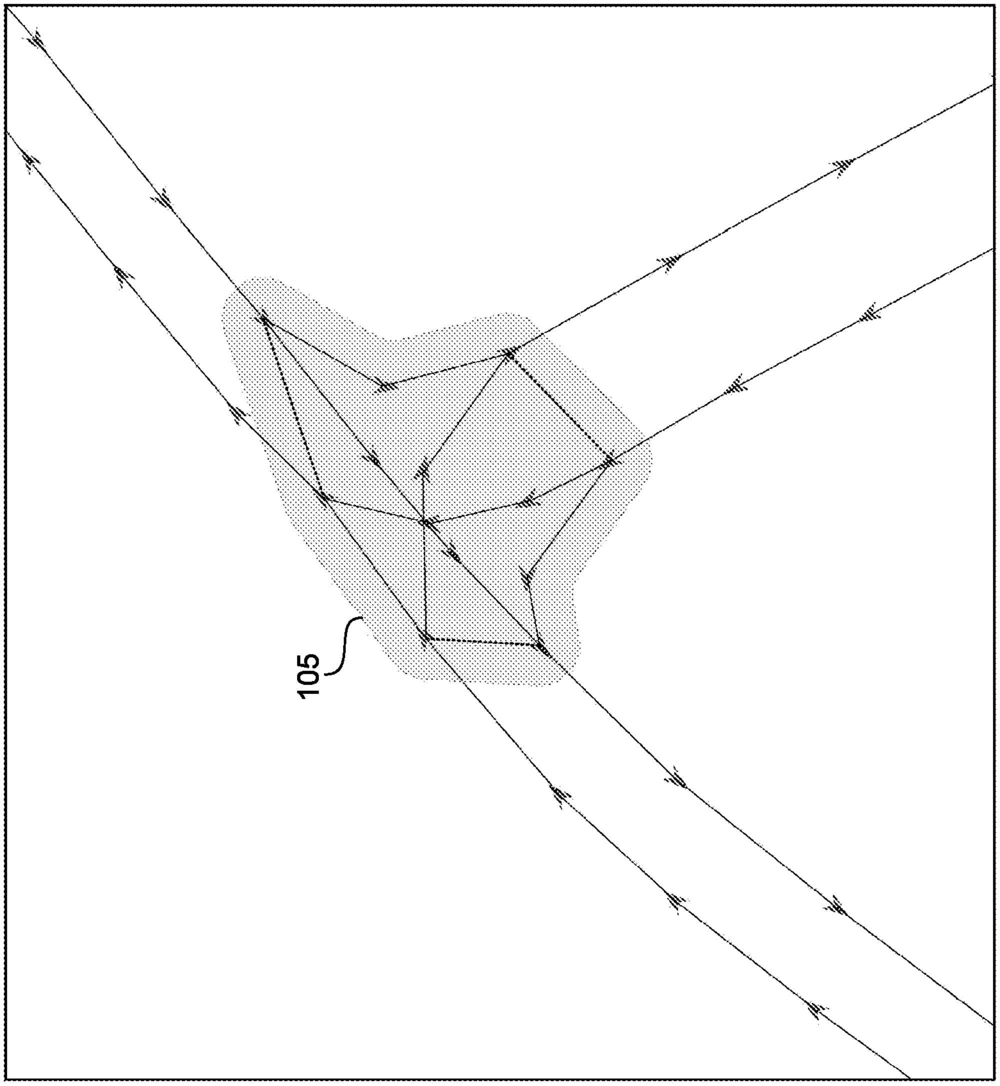
FIG. 17 depicts a portion of the map with a marked intersection in which split-join partners are indicated with dotted lines.

Using these patterns, intersection areas can be identified during post-processing, an example of the result is intersection area 105 presented in FIG. 17. This step of identifying intersection areas is performed after areas have been tagged (such as tagged area 103) and multi-path connections have been cleaned up (such as tagged area 103'). All clusters that are identified as being part of an area, are ignored for intersection calculations.

In a first step, the vicinity of each split is searched for a corresponding join on the opposite lane. For this, all joins within a search radius (e.g. use twice the cluster radius, 60 m, as search radius) are evaluated. A join is considered to be a match if its heading is opposite to that of the join up to a threshold (e.g. limit heading discrepancy by 45 degrees) and its relative position is on the side where the other lane is expected. Which side this is depends on whether the area obeys left-hand-driving or right-hand-driving rules. Note, that this does not necessarily result in a strict one-to-one correspondence. It is possible that multiple valid matches are produced in which case they are all considered valid partners.

Once the split-join partners have been established, intersections are identified. The search process starts at a split or join that is not yet part of any intersection. Using this initial cluster, clusters that belong to the same intersection are searched for. A cluster is considered to belong to the same intersection if one of the following holds: (i) the cluster is a split-join partner of the initial cluster, (ii) the cluster is a join and the initial cluster is a split and there is a short outgoing path to the cluster (e.g. limited path length to 4 edges), or (iii) the cluster is a split and the initial cluster is a join and a short path leads from the cluster to the initial cluster. The search then continues from all found members of the intersection until no further cluster can be added and the search terminates. The intersection is then comprised of the clusters that were identified as well as the short paths between them. This process is repeated from a split or join that is not part of any intersection yet until all splits and joins have been processed.

The process described above results in vertices and edges of the road map being tagged as intersections. To obtain a geometric representation, one can geometrically inflate the paths. The method used in this work is a three-step process: 1) the clusters (represented as points) and edges belonging to an intersection are inflated (buffered) by a larger value. 2) if the resulting polygons have holes, the holes are filled. 3) the polygons are deflated (shrunk) by a smaller value (e.g. inflate by 20 m and deflate by 10 m) to obtain the final geometry. The process of over-inflating and subsequent deflating results in more natural areas since chasms in the polygon shape are filled.

D. Cleaning Up Tagged Areas

Within tagged areas, a multitude of roads is present, the shapes of which are largely dependent on artefacts of the cluster procedure and do not represent a useful road map. Thus, the roads inside tagged areas must be pruned and useful roads must be identified. The principle used here is to select start and goal positions that are desired to include in the final road map and subsequently find suitable roads to connect them.

VI. Results

Figure 17A:
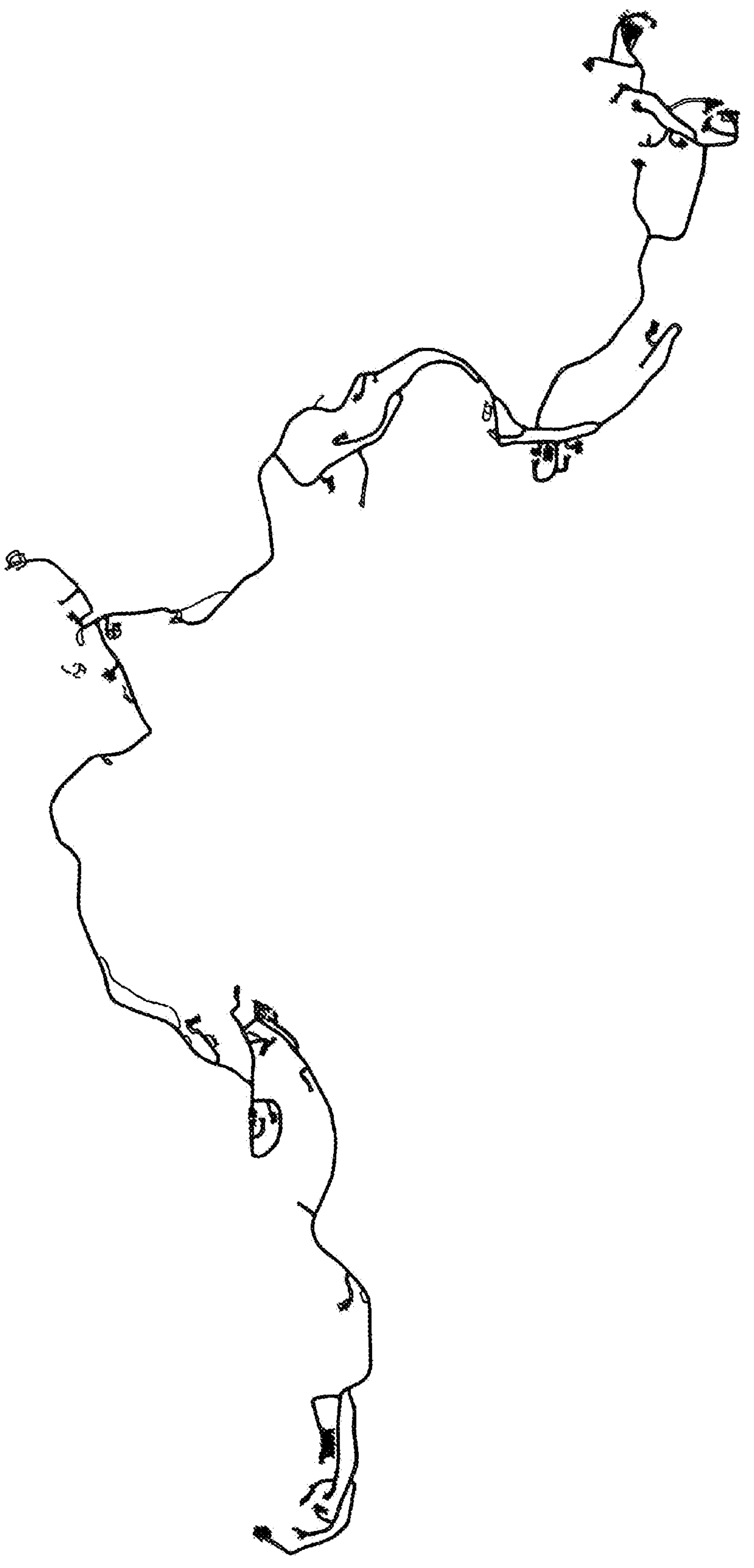
FIG. 17A depicts a map generated by the MGA after post-processing.

A. Comparison of Maps Generated using Different Amounts of Position Data FIG. 17A depicts a an updated and post-processed road map that has been generated by the MGA 33 and which is transmitted by MGA 33 across data network 31, for example for use by the Task Assignment Allocator 55 and/or for display on HMI 28 (FIG. 3) of the vehicles 2-1, . . . , 2-I. FIGS. 18A to 18F graphically illustrate how road maps generated using different amounts of position data, from 6 hours of data to 30 days of data, vary, with tagged areas 103 and intersection areas 105 identified in FIGS. 18A and 18F.

B. Comparison of Cluster Sequence Strategies

In Section III, different strategies for finding a sequence of intermediate clusters were presented. To evaluate the differences between the strategies, maps based on the same dataset were created with different strategies for intermediate clusters. The results are show in FIGS. 19A to 19F and FIGS. 20A to 20F.

While all three strategies result in the same map constellation in many cases, differences exist. Often, these inaccuracies result in multiple paths for the same section of road which are then corrected for using the post-processing technique described in Section V-B. To allow for a better comparison of the effect of the intermediate sequence procedures, the map fragments are shown in the state before multi-path the pruning step was performed alongside the final, pruned version.

While the differences between the procedures are small, it was observed, that the Gravity method resulted in the least number of artefacts. This is unsurprising since the Gravity method is the only one that uses data from individual GPS points instead of just aggregate information formed by the clusters. Thus, the Gravity method is able to deduce the position of a road in a more informed way. This however comes at a computational cost. For the maps presented here, the Gravity method is about two orders of magnitude slower than the other two. Furthermore, it doesn't scale well if many GPS points are kept—an issue that is alleviated by the point pruning described in Section II-D. Thus, if sufficient computational resources are available it is recommended to use the Gravity method. If computational resources are limited, the Chord Angle or Dubins should be used instead.

The examples of FIGS. 7 and 8 are fragments of a map which in its final form and after pruning of old points (cf. Section II-D) consists of 3546 clusters, 8340 high-level connections and 177336 raw GPS points. As a benchmark, the intermediate cluster sequences for all high-level connections were re-calculated. For the Chord Angle and Dubins method, this took about 1.5 seconds each whereas the Gravity method required a computation time of 123 seconds.

C. Comparison of Sampling Rates

Most results shown in this work are based on GPS data with a sampling interval of 5 seconds. To evaluate the effect of larger sampling intervals on map quality, we generated the same map while sub-sampling the available data to mimic larger sampling intervals of 10, 15 and 20 seconds. The map fragment shown in FIGS. 21A to 21D is challenging for map inference due to the shape of the upper intersection and also due to some turns observing only little traffic.

Unsurprisingly, longer sampling intervals quickly lead to artefacts in the form of long direct roads that cut corners short. As a general observation in the data presented here, a 5 second sampling rate results in good quality roads even if only a single traversal of a vehicle was observed. The larger the sampling frequency, the more artefacts appear in the final map and the more data is needed to compensate for it.

A sampling interval of 20 seconds means, that only 25% of the data is available compared to 5 second traversals must be observed to be able to infer the road's location. Since vehicles can cover large distances within 20 seconds, multiple traversals must be observed to be able to infer the road's location.

If the problem is modelled optimistically as a Coupon Collectors Problem, the expectation is that one requires more than 8 vehicle traversals to obtain a coverage similar to a single traversal that was observed with a 5 second sampling interval.

D. Conclusion

Sampling frequencies larger than 20 seconds are highly problematic for road map inference. Twenty second data, while usable in principle, already leads to substantially inferior road maps compared to 5 second data. Using only the part of the data shown here that has a sampling interval of 20 seconds or less results in less that 11% of the truck movements being used for road map inference. Over 89% of all truck movements are not used in full.

This still means, that about 47% of all available data is used. The important point to understand is, that data about truck movement is effectively missing. Thus, the 47% of the data that is used only covers 11% of the truck movements.

The data quality imposes hard constraints on what's achievable by an automatic road network generation procedure. A highly reactive system such as SMG that is able to deduce rarely used or newly created roads with very little data is only possible if data with a good sampling frequency is available.

With low sampling frequency, only roads that are travelled a lot can be deduced (and most likely, a different approach to road map generation should be taken). Given, that the aim of this work is to detect changes in the road network quickly, the ability to infer roads from only few truck movements is essential and reliable high frequency GPS data must be available.

For good results is recommended to use data with sampling intervals of at most 5 seconds.

A method according to the preferred embodiment discussed herein has been successfully tested in a large open cut mine site and high-quality road maps were created. The performance of the method is contingent on data of sufficient quality being available. It is recommended, that data with a sampling rate of at most 5 seconds is used for map generation as it allows for road inference even in the presence of only a single traversal along the road. It was shown, that larger sampling intervals quickly lead to unwanted artefacts and road maps of inferior quality sampling. Since vehicles can cover large distances within 20 seconds, multiple Table 1 below sets out values that have been found to work well in implementing the method that has been described.

TABLE 1

| Configuration parameters | | |
|---|---|---|
| Parameter name | Default | Explanation |
| cluster radius | 30 | Maximum distance of a point to the centre of its cluster. See Section II-A. |
| Cluster move threshold | 3 | Allowed movement of cluster centre before re-clustering. See Section II-A. |
| angular threshold | 30 | Maximum angular distance from a point to its cluster. Used to calculate the angular weight as angularclusterthresholdradius . See Section II-A. |

TABLE 1-continued

Configuration parameters

| Parameter name | Default | Explanation |
|---|---|---|
| cluster merge radius | 15 | Minimum distance between clusters. See Section II-A. |
| intermediate point method | GRAVITY | Select the strategy used to find a sequence of intermediate clusters. See Section III. |
| chord angular tolerance | 30 | Angular threshold for Chord Angle method. See Section III-A. |
| dubins turning radius | 10 | Turning radius for Dubins method. See Section III-B. |
| event backtrack time | 60 | Time difference for tagging areas. See Section IV. |
| event backtrack distance | 200 | Spatial difference for tagging areas. See Section IV. |
| bucket radius | 10 | Radius of digger bucket. See Section II-D1. |
| minimum point age for removal by bucket | 1800 | Minimum age for removal of GPS points by digger buckets. See Section II-D1. |
| minimum prune age | 43200 | Minimum age for pruning old points. See Section II-D2. |
| maximum prune age | 2592000 | Hard maximum age for pruning old points. See Section II-D2. |
| prune age factor | 0.1 | See parameter c in Eq. (3), Section II-D2. |
| maximum connection count | 10 | Desired number of connections to keep when pruning old points. See Section II-D2. |
| allocate points every | 3000 | Number of GPS points to add before clusters are checked for re-clustering. See Section II-A |
| update connections every | 30000 | Number of GPS points to add before connections are checked for re-calculating cluster sequences. See Section II-C. Also triggers re-clustering, so it should be a multiple of allocate points every. |
| prune points every | 30000 | Number of GPS points to add before pruning old points. See Section II-D. Also triggers connection update, so it should be a multiple of update connections every. |
| improve multipath | True | Enables multi-path improvement in post-processing. See Section V-B |
| multipath search max path hops | 4 | Graph search distance for multi-path improvements. See Section V-B. |
| multipath search ignore zones | True | Ignore zones when doing multi-path improvements. See Section V-B. |
| intersection search radius | 60 | Search radius when detecting opposite lanes in intersections. See Section V-C. |
| intersection search angular threshold | 45 | angular tolerance when detecting opposite lanes in intersections. See Section V-C. |
| left hand side driving | True | Set to True if left-hand-side traffic is to be assumed, False for right-hand-side traffic. Used in intersection detection. See Section V-C. |
| intersection search max path hops | 2 | Graph search distance when detecting intersections. See Section V-C. |

The following articles are each incorporated herein in their entireties by reference:

1. Rade Stanojevic, Sofiane Abbar, Saravanan Thirumuruganathan, Sanjay Chawla, Fethi Filali, and Ahid Aleimat. Robust Road Map Inference through Network Alignment of Trajectories. In *Proceedings of the* 2018 *SIAM International Conference on Data Mining*, Proceedings, pages 135-143. Society for Industrial and Applied Mathematics, May 2018a. doi: 10.1137/1.9781611975321.15.
2. Zhongyi Ni, Lijun Xie, Tian Xie, Binhua Shi, and Yao Zheng. Incremental Road Network Generation Based on Vehicle Trajectories. *ISPRS International Journal of Geo-Information,* 7(10):382, October 2018. doi: 10.3390/ijgi7100382.
3. Lester. E. Dubins. On Curves of Minimal Length with a Constraint on Average Curvature, and with Prescribed Initial and Terminal Positions and Tangents. *American Journal of Mathematics,* 79(3):497-516, 1957. ISSN 0002-9327. doi: 10.2307/2372560.

In compliance with the statute, the subject matter disclosed herein has been described in language more or less specific to structural or methodical features. The term "comprises" and its variations, such as "comprising" and "comprised of" is used throughout in an inclusive sense and not to the exclusion of any additional features. It is to be understood that the claimed subject matter is not limited to specific features shown or described since the means herein described herein comprises preferred forms of putting the claimed subject matter into effect. The subject matter is, therefore, claimed in any of its forms or modifications within the proper scope of the appended claims appropriately interpreted by those skilled in the art.

Throughout the specification and claims (if present), unless the context requires otherwise, the term "substantially" or "about" will be understood to not be limited to the value for the range qualified by the terms.

Any embodiment of the herein is meant to be illustrative only and is not meant to be limiting.

The invention claimed is:

1. A method for issuing updates of a map in respect of a geographical area, the map being stored in an electronic memory assembly, the map comprising clusters of vehicle positions of vehicles, with connections between clusters, the clusters each comprised of a number of points allocated thereto, the points corresponding to respective ones of the vehicles at respective times, the method comprising:

operating a data communications assembly to establish data communications with each of the vehicles via a data communications network;

receiving position reports from each of the vehicles across the data communications network with the data communications assembly;

operating a processing assembly to generate batches of the points from the position reports, the points corresponding to vehicle positions for respective vehicles at respective times, in the electronic memory assembly;

operating the processing assembly to make batch-by-batch comparisons of the points of a selected batch of the batches of the points with positions of the clusters of the map;

based upon the comparisons, operating the processing assembly to update the map by performing a cluster update procedure comprising performing each of the following at least once:

a. allocate the points of the selected batch to the clusters;

b. reallocate the points of the maps to the clusters;

c. update positions of the clusters taking into account the allocation and reallocation of the points;

d. create new clusters based on remote points of the selected batch;

e. merge the clusters closer to each other than a predetermined distance; and f. delete selected clusters with no points allocated thereto;

operating the processing assembly to update the connections between the clusters subsequent to the cluster update procedure to thereby produce an updated map; and operating the data communications assembly to transmit the updated map via the data communications network to a remote user.

2. The method of claim 1, where the operating of the processing assembly to generate the batches of the points from the position reports comprises forming batches of input records from consecutive vehicle location points of a vehicle wherein a first point of the input record comprises a source point and a second point comprises a target point.

3. The method of claim 2, wherein the method includes adding the input records to the batch of input records until either a new map is created or until a predetermined batch size is reached.

4. The method of claim 2, including, for each of the source point and the target point, finding a nearest cluster of a current map.

5. The method of claim 4, including, for each of the source point and target point, determining if said source point or said target point is a distance less than a predetermined cluster radius from the nearest cluster.

6. The method of claim 5, wherein the predetermined cluster radius is determined as a maximum distance of said source point or said target point to a centre of the cluster of said source point or said target point.

7. The method of claim 4, including, if said source point or said target point is a distance less than a predetermined cluster radius from the nearest cluster, then allocating said point to the nearest cluster to thereby perform a.

8. The method of claim 7, including updating the position of the nearest cluster taking the allocating of said source point or said target point into account to thereby perform c.

9. The method of claim 5, including, if said source point or said target point is not a distance less than the predetermined cluster radius from the nearest cluster, creating a new cluster using the position of said source point or said target point as the position of the new cluster to thereby perform d.

10. The method of claim 2, including post-processing the electronic map subsequent to processing a first batch of input records and prior to transmitting the updated map via the data communications network to remote user.

11. The method of claim 10, wherein the post-processing includes tagging free-drive areas of the map.

12. The method of claim 11, wherein the post-processing includes tagging free-drive areas in the electronic map by identifying predetermined functional areas.

13. The method of claim 12, wherein the predetermined functional areas includes ore loading and ore unloading areas.

14. The method of claim 11, wherein the post-processing includes trimming areas tagged as free drive-areas in the electronic map.

15. The method of claim 10, wherein the post-processing includes identifying artefacts in the electronic map due to multi-path connections and deleting superfluous low-level connections.

16. The method of claim 10, wherein the post processing includes identifying and tagging intersections in the electronic map.

17. The method of claim 1, wherein subsequent to c., for each point, determining if the point is within a cluster radius of an old cluster that the point is currently allocated to, and it the point is not within the cluster radius, then removing the point from allocation with the old cluster and updating the old cluster's position taking into account the removal of the point.

18. The method of claim 17, including reallocating the point to a new cluster comprising a closest cluster within the cluster radius and updating the new cluster's position taking into account the reallocation of the point to the new cluster.

19. The method of claim 1, wherein e. includes for each cluster ("first cluster") identifying a cluster ("second cluster") closer than the predetermined distance thereto and reallocating all points of the second cluster to the first cluster.

20. A system for generating and updating an electronic map of paths travelled by vehicles in a geographical area, the system comprising:

a plurality of vehicles located in the geographical area and each fitted with a position tracker and a vehicle communications system to transmit a series of chronological position reports in respect of the vehicle;

a data communications network in data communication with the vehicle communications system of each of the plurality of vehicles;

a map generation assembly (MGA) including a processing assembly and an electronic memory assembly, the map generation assembly being in data communication with the data communications network and arranged to receive the position reports, the MGA being configured to:

generate batches of points from the position reports, the points corresponding to vehicle positions for respective vehicles of the plurality of vehicles at respective times, in the electronic memory assembly;

operating the processing assembly to make batch-by-batch comparisons of the points of a selected batch with positions of the clusters of the map;

based upon the comparisons, operating the processing assembly to update the map by performing a cluster update procedure comprising performing each of the following at least once:

a. allocate the points of the selected batch to the clusters;

b. reallocate the points of the maps to the clusters;

c. update the positions of the clusters taking into account the allocation and reallocation of the points;

d. create new clusters based on remote points of the batch;

e. merge the clusters closer to each other than a predetermined distance; and f. delete selected clusters with no points allocated thereto;

operate the processing assembly to update the connections between the clusters subsequent to the cluster update procedure to thereby produce an updated map; and transmit the updated map via the data network to a remote user.

* * * * *